(12) United States Patent
Keh et al.

(10) Patent No.: US 10,341,641 B2
(45) Date of Patent: Jul. 2, 2019

(54) METHOD FOR PERFORMING IMAGE PROCESS AND ELECTRONIC DEVICE THEREOF

(71) Applicant: Samsung Electronics Co., Ltd, Gyeonggi-do (KR)

(72) Inventors: Yongchan Keh, Seoul (KR); Sungsoon Kim, Seoul (KR); Jungkee Lee, Gyeonggi-do (KR); Byeonghoon Park, Gyeonggi-do (KR); Kisuk Sung, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/273,570

(22) Filed: Sep. 22, 2016

(65) Prior Publication Data
US 2017/0084044 A1 Mar. 23, 2017

(30) Foreign Application Priority Data
Sep. 22, 2015 (KR) .................. 10-2015-0134091

(51) Int. Cl.
*H04N 13/271* (2018.01)
*H04N 13/207* (2018.01)

(52) U.S. Cl.
CPC ......... *H04N 13/271* (2018.05); *H04N 13/207* (2018.05)

(58) Field of Classification Search
CPC ..... G01B 11/22; G01B 11/24; G01B 11/2509; G01B 11/002; G01B 11/14; G01B 11/245; G01B 11/2545; G06F 1/3243; Y02B 60/1239; H04N 13/0203; H04N 5/335; H04N 5/30; H04N 13/0022; H04N 13/0221; H04N 13/0232; H04N 13/0239; H04N 5/23254; H04N 19/43; H04N 19/513; H04N 19/527; H04N 19/533; H04N 19/537; H04N 19/59; H04N 19/08; H04N 5/2254; H04N 13/0242; H04N 5/23212; H04N 9/045; H04N 2013/0081; H04N 5/2253;
(Continued)

(56) References Cited

U.S. PATENT DOCUMENTS

| | | | | |
|---|---|---|---|---|
| 5,692,062 A | * | 11/1997 | Lareau | H04N 5/335 348/E3.023 |
| 7,369,162 B2 | * | 5/2008 | Yagi | H04N 5/335 348/222.1 |

(Continued)

FOREIGN PATENT DOCUMENTS

| | | |
|---|---|---|
| KR | 10-2011-0124892 | 11/2011 |
| KR | 10-1336139 | 12/2013 |

(Continued)

*Primary Examiner* — Aklilu K Woldemariam

(57) ABSTRACT

An electronic device according to various embodiments of the present disclosure includes: a first image sensor; a second image sensor; and a processor operatively coupled to the first image sensor and the image second sensor, configured to determine at least one Region of Interest (ROI) based on a first information acquired using the first image sensor, acquire second information corresponding to at least a part of the at least one ROI using the second image sensor, identify a motion related to the at least one ROI based on the second information, and perform a function corresponding to the motion.

20 Claims, 24 Drawing Sheets

(58) Field of Classification Search
CPC .. H04N 5/23238; H04N 5/332; H04N 5/3572;
H04N 5/367; H04N 9/09; H04N 9/093;
H04N 13/00; H04N 5/378; H04N 5/2258;
H04N 5/2353; H04N 5/2252; H04N
5/23296; H04N 5/265; H04N 5/23229;
H04N 5/23245; H04N 5/2355; H04N
5/343; H04N 5/2259; H04N 5/23232;
H04N 5/2226; H04N 5/2352; H04N
5/238; H04N 5/2621; H04N 5/2625;
H04N 9/75; H04N 13/207; H04N 13/271;
H04N 5/145; H04N 5/147; H04N
5/23248; H04N 5/23264; G06T 7/20;
G06T 7/223; G06T 11/00; G06T
2207/30248; G06T 7/202; G06T 7/73;
G06T 2207/10016; G06T 2207/10024;
G06T 2207/10028; G06T 2207/10048;
G06T 2207/30196; G06T 7/11; G06T
7/174; G06T 7/194; G06T 7/269; Y02D
10/152; G06K 9/00026; G03B 17/005;
G03B 7/097
USPC .................. 348/48, 335, 571; 382/107, 128
See application file for complete search history.

(56) References Cited

U.S. PATENT DOCUMENTS

| | | | | |
|---|---|---|---|---|
| 2003/0011693 A1* | 1/2003 | Oda | ................ | H01L 27/14818 348/272 |
| 2010/0165135 A1* | 7/2010 | Kalevo | ................ | H04N 5/2351 348/221.1 |
| 2011/0202069 A1* | 8/2011 | Prisco | ................ | G01D 5/35316 606/130 |
| 2012/0044328 A1* | 2/2012 | Gere | ................ | H04N 9/09 348/48 |
| 2012/0075432 A1* | 3/2012 | Bilbrey | ................ | G01J 4/00 348/48 |
| 2012/0327287 A1* | 12/2012 | Meyers | ................ | G01B 11/24 348/335 |
| 2013/0057434 A1* | 3/2013 | Krasner | ................ | G01S 5/0263 342/387 |
| 2013/0141597 A1* | 6/2013 | Lee | ................ | H04N 5/23219 348/207.11 |
| 2013/0150093 A1* | 6/2013 | Seol | ................ | H04N 5/232 455/457 |
| 2013/0308025 A1* | 11/2013 | Hosokawa | ................ | H04N 5/335 348/302 |
| 2014/0125994 A1 | 5/2014 | Kim et al. | | |
| 2015/0054974 A1* | 2/2015 | Ehmann | ................ | H04N 5/2226 348/218.1 |
| 2015/0062302 A1* | 3/2015 | Uchiyama | ................ | G01B 11/002 348/46 |
| 2015/0077581 A1* | 3/2015 | Baltz | ................ | H04N 5/2353 348/218.1 |
| 2015/0103200 A1* | 4/2015 | Vondran, Jr. | ................ | H04N 13/133 348/223.1 |
| 2015/0287192 A1* | 10/2015 | Sasaki | ................ | A61B 1/00009 382/128 |
| 2015/0324636 A1* | 11/2015 | Bentley | ................ | G11B 27/17 386/227 |
| 2015/0331093 A1* | 11/2015 | Pandharipande | .. | H05B 37/0227 367/93 |
| 2016/0012646 A1* | 1/2016 | Huang | ................ | G06T 5/005 345/419 |
| 2016/0037114 A1* | 2/2016 | Mandelli | ................ | H01L 27/14601 250/208.1 |

FOREIGN PATENT DOCUMENTS

KR 10-2014-0006465 1/2014
KR 10-2014-0056986 5/2014

* cited by examiner

METHOD FOR PERFORMING IMAGE PROCESS AND ELECTRONIC DEVICE THEREOF

CROSS-REFERENCE TO RELATED APPLICATION(S) AND CLAIM OF PRIORITY

The present application is related to and claims the priority under 35 U.S.C. § 119(a) to Korean Application Serial No. 10-2015-0134091, which was filed in the Korean Intellectual Property Office on Sep. 22, 2015, the entire content of which is hereby incorporated by reference.

TECHNICAL FIELD

Various embodiments of the present disclosure relate to a method of processing an image and an electronic device thereof.

BACKGROUND

The electronic device may sense various information from a surrounding environment of the electronic device using a sensor. The electronic device may recognize various motions and gestures of a subject using an image sensor. For example, an electronic device including a depth sensor (e.g., a depth camera) may acquire not only information of a (x, y) pixel, but also depth data (e.g., a depth map) between the electronic device and the subject. The depth data may be information indicating a distance between the electronic device (e.g., an image sensor) and the subject.

SUMMARY

To address the above-discussed deficiencies, it is a primary object of the present disclosure to provide an apparatus and method for reducing the amount of data to be processed when the electronic device recognizes the action of the subject.

Various embodiments of the present disclosure propose an apparatus and a method in which an electronic device may configure an area of a subject having difference information, and extract and process image information of the configured Region of Interest (ROI) to recognize an action of the subject.

According to various embodiments, an electronic device may include: a first image sensor; a second image sensor; and a processor connected to the first image sensor and the second image sensor, wherein the processor is configured to determine at least one ROI based on a first information acquired using the first image sensor, acquire second information corresponding to at least a part of the at least one ROI using the second image sensor, identify a motion related to the at least one ROI based on the second information and perform a function corresponding to the motion.

According to various embodiments, a method of operating an electronic device may include: determining at least one ROI based on a first information acquired using a first image sensor; acquiring second information corresponding to at least a part of the at least one ROI using a second image sensor; identifying a motion related to the at least one ROI based on the second information, and performing a function corresponding to the motion.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
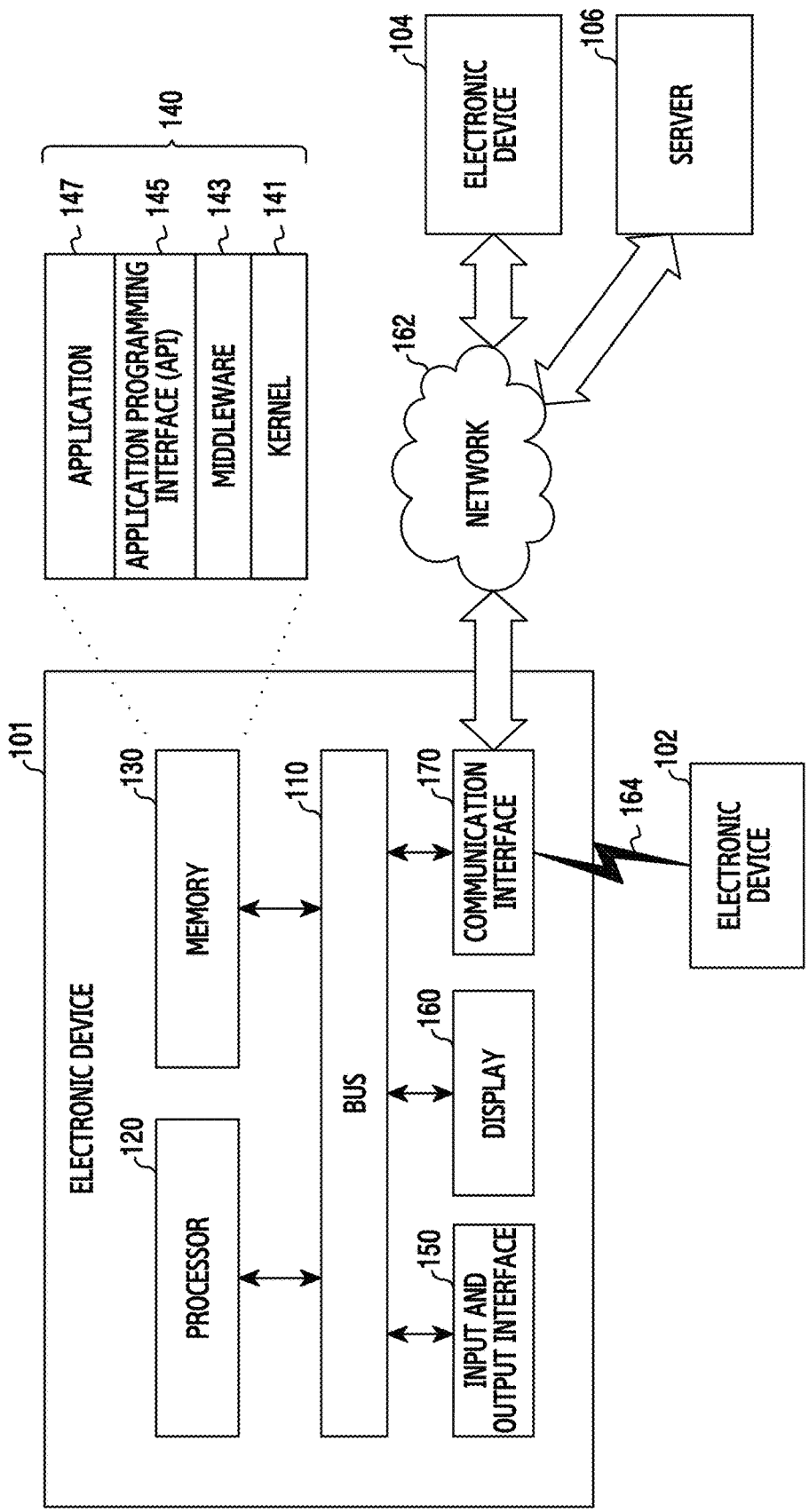
FIG. 1 illustrates a network environment including an electronic device according to various embodiments of the present disclosure.

FIGS. 1 through 20, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) for performing the corresponding operations or a generic-purpose processor (e.g., central processing unit (CPU) or application processor (AP)) that can perform the corresponding operations by executing one or more software programs stored in a memory device.

The terms used in the present disclosure are only used to describe specific embodiments, and are not intended to limit the present disclosure. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync®, Apple TV®, or Google TV®), a game console (e.g., Xbox® and PlayStation®), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MM), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 illustrates a network environment including an electronic device according to various embodiments of the present disclosure.

An electronic device 101 within a network environment, according to various embodiments, will be described with reference to FIG. 1. The electronic device 101 may include a bus 110, a processor 120, a memory 130, an input/output interface 150, a display 160, and a communication interface 170. According to an embodiment of the present disclosure, the electronic device 101 may omit at least one of the above components or may further include other components.

The bus 110 may include, for example, a circuit which interconnects the components 110 to 170 and delivers a communication (e.g., a control message and/or data) between the components 110 to 170.

The processor 120 may include one or more of a Central Processing Unit (CPU), an Application Processor (AP), and a Communication Processor (CP). The processor 120 may carry out, for example, calculation or data processing relating to control and/or communication of at least one other component of the electronic device 101.

The memory 130 may include a volatile memory and/or a non-volatile memory. The memory 130 may store, for example, commands or data relevant to at least one other component of the electronic device 101. According to an embodiment of the present disclosure, the memory 130 may store software and/or a program 140. The program 140 may include, for example, a kernel 141, middleware 143, an Application Programming Interface (API) 145, and/or application programs (or "applications") 147. At least some of the kernel 141, the middleware 143, and the API 145 may be referred to as an Operating System (OS).

The kernel 141 may control or manage system resources (e.g., the bus 110, the processor 120, or the memory 130) used for performing an operation or function implemented in the other programs (e.g., the middleware 143, the API 145, or the application programs 147). Furthermore, the kernel 141 may provide an interface through which the middleware 143, the API 145, or the application programs 147 may access the individual components of the electronic device 101 to control or manage the system resources.

The middleware 143, for example, may serve as an intermediary for allowing the API 145 or the application programs 147 to communicate with the kernel 141 to exchange data.

Also, the middleware 143 may process one or more task requests received from the application programs 147 according to priorities thereof. For example, the middleware 143 may assign priorities for using the system resources (e.g., the bus 110, the processor 120, the memory 130, or the like) of the electronic device 101, to at least one of the application programs 147. For example, the middleware 143 may perform scheduling or loading balancing on the one or more task requests by processing the one or more task requests according to the priorities assigned thereto.

The API 145 is an interface through which the applications 147 control functions provided from the kernel 141 or the middleware 143, and may include, for example, at least one interface or function (e.g., instruction) for file control, window control, image processing, character control, and the like.

The input/output interface 150, for example, may function as an interface that may transfer commands or data input from a user or another external device to the other element(s) of the electronic device 101. Furthermore, the input/output interface 150 may output the commands or data received from the other element(s) of the electronic device 101 to the user or another external device.

Examples of the display 160 may include a Liquid Crystal Display (LCD), a Light-Emitting Diode (LED) display, an Organic Light-Emitting Diode (OLED) display, a MicroElectroMechanical Systems (MEMS) display, and an electronic paper display. The display 160 may display, for example, various types of contents (e.g., text, images, videos, icons, or symbols) to users. The display 160 may include a touch screen, and may receive, for example, a touch, gesture, proximity, or hovering input using an electronic pen or a user's body part.

The communication interface 170 may establish communication, for example, between the electronic device 101 and an external device (e.g., a first external electronic device 102, a second external electronic device 104, or a server 106). For example, the communication interface 170 may be connected to a network 162 through wireless or wired communication, and may communicate with an external device (e.g., the second external electronic device 104 or the server 106). The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), Wireless Broadband (WiBro), and Global System for Mobile Communications (GSM), as a cellular communication protocol. In addition, the wireless communication may include, for example, short range communication 164. The short-range communication 164 may include at least one of, for example, Wi-Fi, Bluetooth, Near Field Communication (NFC), and Global Navigation Satellite System (GNSS). GNSS may include, for example, at least one of global positioning system (GPS), global navigation satellite system (Glonass), Beidou Navigation satellite system (Beidou) or Galileo, and the European global satellite-based navigation system, based on a location, a bandwidth, or the like. Hereinafter, in the present disclosure, the "GPS" may be interchangeably used with the "GNSS". The wired communication may include, for example, at least one of a Universal Serial Bus (USB), a High Definition Multimedia Interface (HDMI), Recommended Standard 232 (RS-232), and a Plain Old Telephone Service (POTS). The network 162 may include at least one of a telecommunication network such as a computer network (e.g., a LAN or a WAN), the Internet, and a telephone network.

Each of the first and second external electronic devices 102 and 104 may be of a type identical to or different from that of the electronic device 101. According to an embodiment of the present disclosure, the server 106 may include a group of one or more servers. According to various embodiments of the present disclosure, all or some of the operations performed in the electronic device 101 may be executed in another electronic device or a plurality of electronic devices (e.g., the electronic devices 102 and 104 or the server 106). According to an embodiment of the present disclosure, when the electronic device 101 has to perform some functions or services automatically or in response to a request, the electronic device 101 may request another device (e.g., the electronic device 102 or 104 or the server 106) to execute at least some functions relating thereto instead of or in addition to autonomously performing the functions or services. Another electronic device (e.g., the electronic device 102 or 104, or the server 106) may execute the requested functions or the additional functions, and may deliver a result of the execution to the electronic device 101. The electronic device 101 may process the received result as it is or additionally, and may provide the requested functions or services. To this end, for example, cloud computing, distributed computing, or client-server computing technologies may be used.

Figure 2:
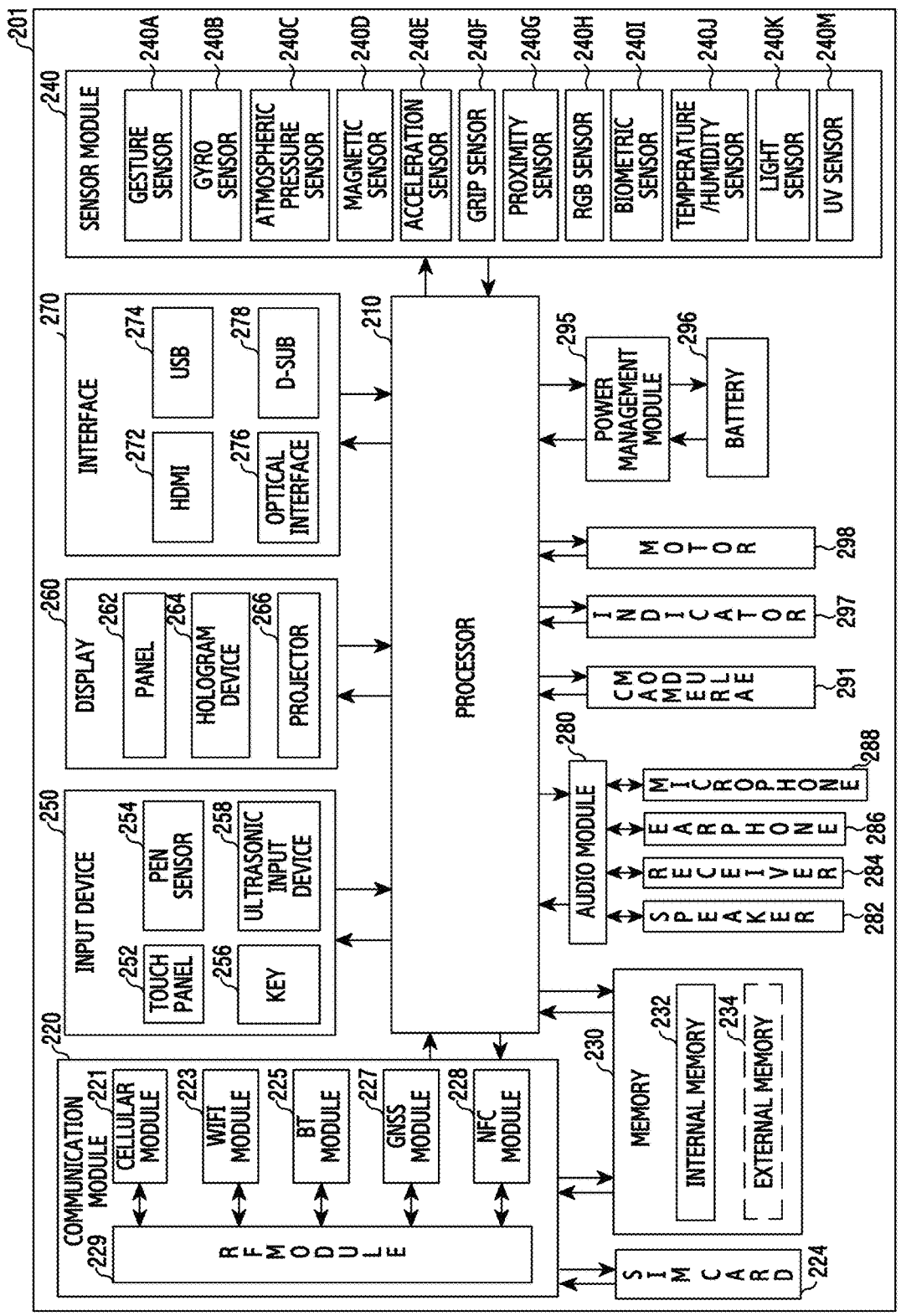
FIG. 2 illustrates a block diagram of an electronic device according to various embodiments of the present disclosure.

FIG. 2 is a block diagram of an electronic device according to various embodiments of the present disclosure.

The electronic device 201 may include, for example, all or a part of the electronic device 101 shown in FIG. 1. The electronic device 201 may include one or more processors 210 (e.g., Application Processors (AP)), a communication module 220, a Subscriber Identification Module (SIM) 224, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software components connected to the processor 210 by driving an operating system or an application program, and perform processing of various pieces of data and calculations. The processor 210 may be embodied as, for example, a System on Chip (SoC). According to an embodiment of the present disclosure, the processor 210 may further include a Graphic Processing Unit (GPU) and/or an image signal processor. The processor 210 may include at least some (for example, a cellular module 221) of the components illustrated in FIG. 2. The processor 210 may load, into a volatile memory, commands or data received from at least one (e.g., a non-volatile memory) of the other components and may process the loaded commands or data, and may store various data in a non-volatile memory.

The communication module 220 may have a configuration equal or similar to that of the communication interface 170 of FIG. 1. The communication module 220 may include, for example, a cellular module 221, a Wi-Fi module 223, a BT module 225, a GNSS module 227 (e.g., a GPS module 227, a Glonass module, a Beidou module, or a Galileo module), an NFC module 228, and a Radio Frequency (RF) module 229.

The cellular module 221, for example, may provide a voice call, a video call, a text message service, or an Internet service through a communication network. According to an embodiment of the present disclosure, the cellular module 221 may distinguish and authenticate the electronic device 201 in a communication network using the subscriber identification module 224 (for example, the SIM card). According to an embodiment of the present disclosure, the cellular module 221 may perform at least some of the functions that the AP 210 may provide. According to an embodiment of the present disclosure, the cellular module 221 may include a communication processor (CP).

For example, each of the Wi-Fi module 223, the BT module 225, the GNSS module 227, and the NFC module 228 may include a processor for processing data transmitted/received through a corresponding module. According to an embodiment of the present disclosure, at least some (e.g., two or more) of the cellular module 221, the Wi-Fi module 223, the BT module 225, the GNSS module 227, and the NFC module 228 may be included in one Integrated Chip (IC) or IC package.

The RF module 229, for example, may transmit/receive a communication signal (e.g., an RF signal). The RF module 229 may include, for example, a transceiver, a Power Amplifier Module (PAM), a frequency filter, a Low Noise Amplifier (LNA), and an antenna. According to another embodiment of the present disclosure, at least one of the cellular module 221, the WIFI module 223, the BT module 225, the GNSS module 227, and the NFC module 228 may transmit/receive an RF signal through a separate RF module.

The subscriber identification module 224 may include, for example, a card including a subscriber identity module and/or an embedded SIM, and may contain unique identification information (e.g., an Integrated Circuit Card Identifier (ICCID)) or subscriber information (e.g., an International Mobile Subscriber Identity (IMSI)).

The memory 230 (e.g., the memory 130) may include, for example, an embedded memory 232 or an external memory 234. The embedded memory 232 may include at least one of a volatile memory (e.g., a Dynamic Random Access Memory (DRAM), a Static RAM (SRAM), a Synchronous Dynamic RAM (SDRAM), and the like) and a non-volatile memory (e.g., a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash memory or a NOR flash memory), a hard disc drive, a Solid State Drive (SSD), and the like).

The external memory 234 may further include a flash drive, for example, a Compact Flash (CF), a Secure Digital (SD), a Micro Secure Digital (Micro-SD), a Mini Secure Digital (Mini-SD), an eXtreme Digital (xD), a MultiMediaCard (MMC), a memory stick, or the like. The external memory 234 may be functionally and/or physically connected to the electronic device 201 through various interfaces.

The sensor module 240, for example, may measure a physical quantity or detect an operation state of the electronic device 201, and may convert the measured or detected information into an electrical signal. The sensor module 240 may include, for example, at least one of a gesture sensor 240A, a gyro sensor 240B, an atmospheric pressure sensor (barometer) 240C, a magnetic sensor 240D, an acceleration sensor 240E, a grip sensor 240F, a proximity sensor 240G, a color sensor 240H (e.g., red, green, and blue (RGB) sensor), a biometric sensor (medical sensor) 240I, a temperature/humidity sensor 240J, an illuminance sensor 240K, and a Ultra Violet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris scan sensor, and/or a finger scan sensor. The sensor module 240 may further include a control circuit for controlling one or more sensors included therein. According to an embodiment of the present disclosure, the electronic device 201 may further include a processor configured to control the sensor module 240, as a part of the processor 210 or separately from the processor 210, and may control the sensor module 240 while the processor 210 is in a sleep state.

The input device 250 may include, for example, a touch panel 252, a (digital) pen sensor 254, a key 256, or an ultrasonic input device 258. The touch panel 252 may use, for example, at least one of a capacitive type, a resistive type, an infrared type, and an ultrasonic type. The touch panel 252 may further include a control circuit. The touch panel 252 may further include a tactile layer, and provide a tactile reaction to the user.

The (digital) pen sensor 254 may include, for example, a recognition sheet which is a part of the touch panel or is separated from the touch panel. The key 256 may include, for example, a physical button, an optical key or a keypad. The ultrasonic input device 258 may detect, through a microphone (e.g., the microphone 288), ultrasonic waves generated by an input tool, and identify data corresponding to the detected ultrasonic waves.

The display 260 (e.g., the display 160) may include a panel 262, a hologram device 264, or a projector 266. The panel 262 may include a configuration identical or similar to the display 160 illustrated in FIG. 1. The panel 262 may be implemented to be, for example, flexible, transparent, or wearable. The panel 262 may be embodied as a single module with the touch panel 252. The hologram device 264 may show a three dimensional (3D) image in the air by using an interference of light. The projector 266 may project light onto a screen to display an image. The screen may be located, for example, in the interior of or on the exterior of the electronic device 201. According to an embodiment of the present disclosure, the display 260 may further include a control circuit for controlling the panel 262, the hologram device 264, or the projector 266.

The interface 270 may include, for example, a High-Definition Multimedia Interface (HDMI) 272, a Universal Serial Bus (USB) 274, an optical interface 276, or a D-sub-miniature (D-sub) 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280, for example, may bilaterally convert a sound and an electrical signal. At least some components of the audio module 280 may be included in, for example, the input/output interface 150 illustrated in FIG. 1. The audio module 280 may process voice information input or output through, for example, a speaker 282, a receiver 284, earphones 286, or the microphone 288.

The camera module 291 is, for example, a device which may photograph a still image and a video. According to an embodiment of the present disclosure, the camera module 291 may include one or more image sensors (e.g., a front sensor or a back sensor), a lens, an Image Signal Processor (ISP) or a flash (e.g., LED or xenon lamp).

The power management module 295 may manage, for example, power of the electronic device 201. According to an embodiment of the present disclosure, the power management module 295 may include a Power Management Integrated Circuit (PMIC), a charger Integrated Circuit (IC), or a battery or fuel gauge. The PMIC may use a wired and/or wireless charging method. Examples of the wireless charging method may include, for example, a magnetic resonance method, a magnetic induction method, an electromagnetic wave method, and the like. Additional circuits (e.g., a coil loop, a resonance circuit, a rectifier, etc.) for wireless charging may be further included. The battery gauge may measure, for example, a residual quantity of the battery 296, and a voltage, a current, or a temperature while charging. The battery 296 may include, for example, a rechargeable battery and/or a solar battery.

The indicator 297 may display a particular state (e.g., a booting state, a message state, a charging state, or the like) of the electronic device 201 or a part (e.g., the processor 210) of the electronic device 201. The motor 298 may convert an electrical signal into a mechanical vibration, and may generate a vibration, a haptic effect, or the like. Although not illustrated, the electronic device 201 may include a processing device (e.g., a GPU) for supporting a mobile TV. The processing device for supporting a mobile TV may process, for example, media data according to a certain standard such as Digital Multimedia Broadcasting (DMB), Digital Video Broadcasting (DVB), or mediaFLO®.

Each of the above-described component elements of hardware according to the present disclosure may be configured with one or more components, and the names of the corresponding component elements may vary based on the type of electronic device. In various embodiments, the electronic device may include at least one of the above-described elements. Some of the above-described elements may be omitted from the electronic device, or the electronic device may further include additional elements. Also, some of the hardware components according to various embodiments may be combined into one entity, which may perform functions identical to those of the relevant components before the combination.

Figure 3:
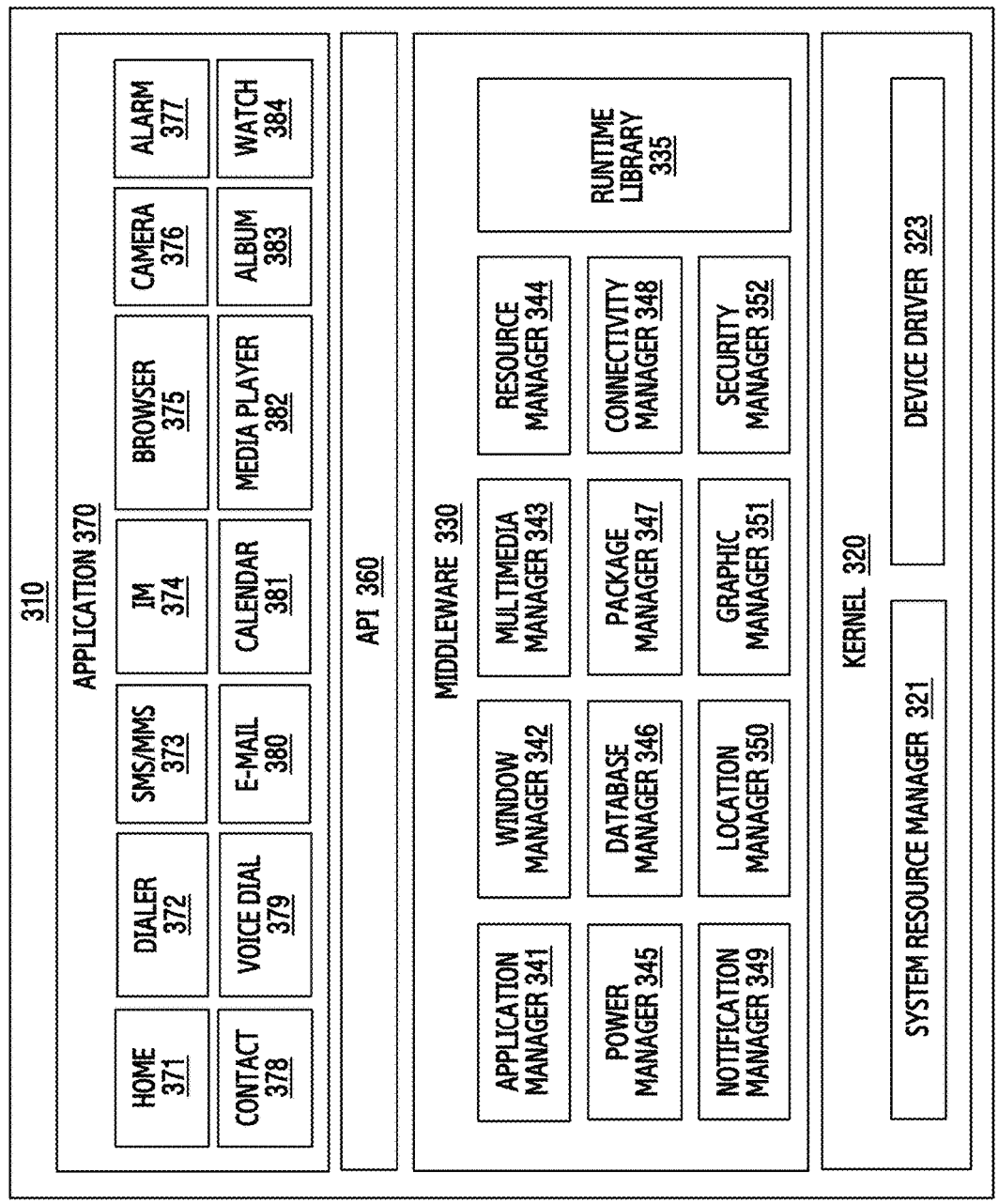
FIG. 3 is a block diagram illustrating a program according to various embodiments of the present disclosure.

FIG. 3 is a block diagram of a program module according to various embodiments of the present disclosure.

According to an embodiment of the present disclosure, the program module 310 (e.g., the program 140) may include an Operating System (OS) for controlling resources related to the electronic device (e.g., the electronic device 101) and/or various applications (e.g., the application programs 147) executed in the operating system. The operating system may be, for example, Android®, iOS®, Windows®, Symbian®, Tizen®, Bada®, or the like.

The program module 310 may include a kernel 320, middleware 330, an API 360, and/or applications 370. At least some of the program module 310 may be preloaded on an electronic device, or may be downloaded from an external electronic device (e.g., the electronic device 102 or 104, or the server 106).

The kernel 320 (e.g., the kernel 141) may include, for example, a system resource manager 321 and/or a device driver 323. The system resource manager 321 may control, allocate, or collect system resources. According to an embodiment of the present disclosure, the system resource manager 321 may include a process management unit, a memory management unit, a file system management unit, and the like. The device driver 323 may include, for example, a display driver, a camera driver, a Bluetooth® driver, a shared memory driver, a USB driver, a keypad driver, a Wi-Fi driver, an audio driver, or an Inter-Process Communication (IPC) driver.

For example, the middleware 330 may provide a function required in common by the applications 370, or may provide various functions to the applications 370 through the API 360 so as to enable the applications 370 to efficiently use the limited system resources in the electronic device. According to an embodiment of the present disclosure, the middleware 330 (e.g., the middleware 143) may include at least one of a run time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while an application 370 is being executed. The runtime library 335 may perform input/output management, memory management, the functionality for an arithmetic function, or the like.

The application manager 341 may manage, for example, a life cycle of at least one of the applications 370. The window manager 342 may manage Graphical User Interface (GUI) resources used by a screen. The multimedia manager 343 may recognize a format required for reproduction of various media files, and may perform encoding or decoding of a media file by using a codec suitable for the corresponding format. The resource manager 344 may manage resources of a source code, a memory, and a storage space of at least one of the applications 370.

The power manager 345 may operate together with, for example, a Basic Input/Output System (BIOS) or the like to manage a battery or power source and may provide power information or the like required for the operations of the electronic device. The database manager 346 may generate, search for, and/or change a database to be used by at least one of the applications 370. The package manager 347 may manage installation or an update of an application distributed in a form of a package file.

For example, the connectivity manager 348 may manage wireless connectivity such as Wi-Fi or Bluetooth. The notification manager 349 may display or notify of an event such as an arrival message, promise, proximity notification, and the like in such a way that does not disturb a user. The location manager 350 may manage location information of an electronic device. The graphic manager 351 may manage a graphic effect which will be provided to a user, or a user interface related to the graphic effect. The security manager 352 may provide all security functions required for system security, user authentication, or the like. According to an embodiment of the present disclosure, when the electronic device (e.g., the electronic device 101) has a telephone call function, the middleware 330 may further include a telephony manager for managing a voice call function or a video call function of the electronic device.

The middleware 330 may include a middleware module that forms a combination of various functions of the above-described components. The middleware 330 may provide a module specialized for each type of OS in order to provide a differentiated function. Further, the middleware 330 may dynamically remove some of the existing components or add new components.

The API 360 (e.g., the API 145) is, for example, a set of API programming functions, and may be provided with a different configuration according to an OS. For example, in the case of Android or iOS, one API set may be provided for each platform. In the case of Tizen, two or more API sets may be provided for each platform.

The applications 370 (e.g., the application programs 147) may include, for example, one or more applications which may provide functions such as a home 371, a dialer 372, an SMS/MMS 373, an Instant Message (IM) 374, a browser 375, a camera 376, an alarm 377, contacts 378, a voice dial 379, an email 380, a calendar 381, a media player 382, an album 383, a clock 384, health care (e.g., measuring exercise quantity or blood sugar), or environment information (e.g., providing atmospheric pressure, humidity, or temperature information).

According to an embodiment of the present disclosure, the applications 370 may include an application (hereinafter, referred to as an "information exchange application" for convenience of description) that supports exchanging information between the electronic device (e.g., the electronic device 101) and an external electronic device (e.g., the electronic device 102 or 104). The information exchange application may include, for example, a notification relay application for transferring specific information to an external electronic device or a device management application for managing an external electronic device.

For example, the notification relay application may include a function of transferring, to the external electronic device (e.g., the electronic device 102 or 104), notification information generated from other applications of the electronic device 101 (e.g., an SMS/MMS application, an e-mail application, a health management application, or an environmental information application). Further, the notification relay application may receive notification information from, for example, an external electronic device and provide the received notification information to a user.

The device management application may manage (e.g., install, delete, or update), for example, at least one function of an external electronic device (e.g., the electronic device 102 or 104) communicating with the electronic device (e.g., a function of turning on/off the external electronic device itself (or some components) or a function of adjusting the brightness (or a resolution) of the display), applications operating in the external electronic device, and services provided by the external electronic device (e.g., a call service or a message service).

According to an embodiment of the present disclosure, the applications 370 may include applications (e.g., a health care application of a mobile medical appliance or the like) designated according to an external electronic device (e.g., attributes of the electronic device 102 or 104). According to an embodiment of the present disclosure, the applications 370 may include an application received from an external electronic device (e.g., the server 106, or the electronic device 102 or 104). According to an embodiment of the present disclosure, the applications 370 may include a preloaded application or a third party application that may be downloaded from a server. The names of the components of the program module 310 of the illustrated embodiment of the present disclosure may change according to the type of operating system.

According to various embodiments, at least a part of the programming module 310 may be implemented in software, firmware, hardware, or a combination of two or more thereof. At least some of the program module 310 may be implemented (e.g., executed) by, for example, the processor (e.g., the processor 1410). At least some of the program module 310 may include, for example, a module, a program, a routine, a set of instructions, and/or a process for performing one or more functions.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a unit of an integrated component element or a part thereof. The "module" may be a unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable recoding media may be, for example, the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

Figure 4:
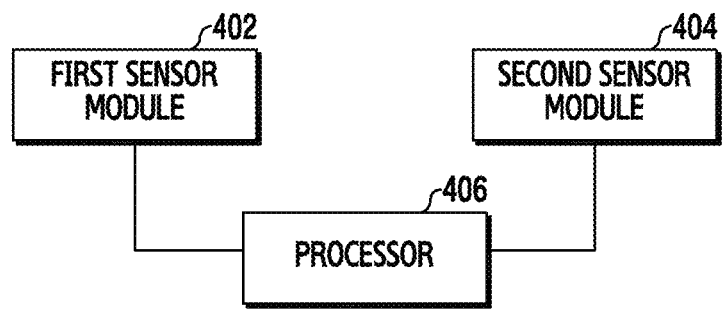
FIG. 4 is a block diagram illustrating an electronic device according to various embodiments of the present disclosure.

FIG. 4 is a block diagram illustrating an electronic device according to various embodiments of the present disclosure.

Referring to FIG. 4, an electronic device may include a first sensor module 402, a second sensor module 404, and a processor 406. The electronic device may be an electronic device (101 or 201). The first sensor module 402 may be the camera module 291. The second sensor module 404 may be included in the camera module 291 or may be independently configured. The processor 406 may be a processor (120 or 210).

The first sensor module 402 may include an image sensor for generating difference information of a subject. The difference information may be a difference value according to motion of the subject between images in different time zones. Difference information output from the first sensor module 402 may be Address-Event Representation (AER) data. For example, the first sensor module 402 may output difference information (1 bit data) indicating variation (+ or −) instead of outputting an image density value (RGB intensity value) of each (x, y) pixel. The first sensor module 402 may be asynchronous with a system clock without being synchronized with the system clock, to generate difference information. Then, the first sensor module 402 may generate the difference information in response to or when a difference (e.g., motion of a subject) of the subject is generated. Therefore, the first sensor module 402 may output the difference information (e.g., dynamic data of the subject) regardless of the system clock, and the elapsed time (μS number) to transmit the difference information may be shortened because a size of the difference information is small (the amount of data is small).

According to an embodiment, a difference image sensor of the first sensor module 402 may be a motion recognition sensor (motion sensor) for recognizing motion of a subject, and may be a dynamic vision recognition sensor (Dynamic Vision Sensor (DVS)). According to an embodiment, the difference image sensor of the first sensor module 402 may be a sensor extracting a difference between frame images. The difference image sensor may compare an image of a current frame and an image of a previous frame so as to generate difference information (1 bit data) indicating pixels in which there is no difference and pixels in which there is a difference. For example, an image of a previous frame and a subject position may be changed when the subject has motion in a frame image, and the difference image sensor may detect an image difference between two frames and then generate the image difference as difference information. The second sensor 404 may include a sensor recognizing a 2 dimensional (2D) image or a 3 dimensional (3D) image. The 3D image sensor may include a 2D image sensor for acquiring a 2D image from the subject and a depth sensor for acquiring depth data. The depth may be a distance between the second sensor module 404 and the subject. The second sensor module 404 including the 3D image sensor may be a depth camera. The depth sensor may recognize a distance between the depth sensor and a subject located in Field of View (FOV) of lens of the second sensor module 404. That is, the depth sensor may map a distance of each part of the subject corresponding to each pixel and recognize depth data (z information) for the 2D image pixel (x, y pixel). The second sensor module 404 may be configured in a structured light scheme, Time-of-Flight (TOF) scheme, or a stereo vision scheme, and may acquire depth data in addition to the 2D image (brightness of the pixel, color data) for each pixel of the subject.

According to an embodiment, the second sensor module 404 may include a pixel array memory corresponding to each pixel. The pixel array memory may respectively store a 2D image and depth data for each pixel. Further, the pixel array memory may have a structure in which pixel data (2D data and depth data) can be randomly accessed. For example, in the second sensor module 404, the processor 406 may randomly access pixel data in a specific area among pixels in a whole area. The processor 406 may connect the first sensor module 402 outputting difference information (difference data) of the subject and the second sensor module 404 outputting the 2D image and depth data of the subject. The processor 406 may analyze the difference information of the first sensor module 402 to determine a Region of Interest (ROI), access pixels of the determined ROI in the second sensor module 404, and process the accessed pixels of the ROI. Herein, the accessed pixels of the ROI may be a 3D image including the 2D image or depth data. The FOV of lens of the second sensor module 404 is included in a FOV of less of the first sensor module 402.

The difference information output from the first sensor module 402 may be displayed as 1-bit data for each pixel, and may be data indicating whether each pixel moves or whether there is a difference between frame images. The first sensor module 402 may generate difference information and transmit the difference information to the processor 406 in response to or when there is motion of the subject. When receiving the difference information, the processor 406 may analyze the received difference information and calculate the ROI (e.g., an area of a pixel in which a moving subject is located). When the processor calculates the ROI with software, a processing speed may be relatively slow (e.g., having an increased latency) and a load (computation load) may increase. Therefore, calculation for determining the ROI may be processed in a hardware configuration. To this end, the processor 406 may include a dedicated hardware block which includes a module acquiring the difference information and a module configuring the ROI. The dedicated hardware block may be, for example, implemented by an exclusive or circuit.

When determining the ROI, the processor 406 may acquire data of ROI in the second sensor module 404. Herein, an output of the second sensor module 404 may be a 3D image including a 2D image or depth data. Hereinafter, the description will be discussed with the 3D image. In the 3D image, each pixel includes the 2D image and the depth data so that an access time interval of the processor 406 may be delayed. In various embodiments of the present disclosure, a pixel array of the second sensor module 404 may have a structure which can be randomly accessed by the processor 406. The pixel array structure of the second sensor module 404 may have a memory device for each pixel, and in the pixel array structure, data may be randomly output (readout) according to a request (addressing request) of the processor 406. Therefore, the processor 406 may speed up an access time interval (readout time) of the data of the ROI. Then, the processor 406 may process the accessed data of the ROI to store or display the data.

The processor 406 may access and process not data for a whole area (e.g., an FOV area) of the second sensor module 404 but only data of the ROI when processing the image, and the processor may reduce the amount of data (e.g., depth data) to be processed by the processor 406. Further, the processor processes only data in a desired area in a data transmission and processing process so that the processor may reduce a transmission time interval, in which the data is transmitted, and power consumption of the electronic device.

According to an embodiment, the processor 406 may acquire data of the ROI through the second sensor module 404. For example, when the second sensor module 404 includes a memory corresponding to each pixel, the processor 406 may acquire the data of the ROI by randomly accessing the data of the ROI. For another example, the processor 406 may sequentially access pixels recognized in the second sensor module 404, and may extract data of an ROI among the pixels.

According to an embodiment, the processor 406 may process an image on the basis of the data of the ROI. For example, the processor 406 may recognize motion of a human body (e.g., a hand, a finger, a foot, or the like) from the data of the ROI.

According to an embodiment, when the first sensor module 402 includes a dynamic vision recognition sensor, the processor 406 may control an operation of the second sensor module 404 on the basis of a motion speed of a subject recognized by the first sensor module 402. For example, the processor 406 may determine that the less the amount of output information of the first sensor module is the slower the motion speed of the subject is, thereby reducing the number of frames per second of the second sensor module 404. Further, the processor 406 may increase a frame-rate of the second sensor module 404 when there is a lot of interpolation or motion according to a time interval.

Figure 5:
FIG. 5 is a block diagram illustrating a first sensor module according to various embodiments of the present disclosure.

FIG. 5 is a block diagram illustrating a first sensor module according to various embodiments of the present disclosure.

Referring to FIG. 5, the first sensor module 402 for recognizing motion may include a receiver 502, a comparison unit 504, and a quantization unit 506. The first sensor module 402 in FIG. 5 may be a configuration of a DVS. FIG. 5 illustrates a configuration of 1 pixel in a pixel array of the first sensor module 402. The receiver 502 may generate photocurrent in response to intensity of entering light in the FOV. The receiver 502 may increase a photocurrent when intensity is stronger than the intensity of the entering light, and decrease the photocurrent when the intensity is weak. Therefore, the receiver 502 may output a corresponding photocurrent according to the intensity of the entering light. The receiver 502 may be a photo-diode.

The comparison 504 may generate a control signal (difference signal) on the basis of the change amount of photocurrent provided from the receiver 502. For example, when the photocurrent increases, the comparison unit 504 may increase the control signal and provide the control signal to the quantization unit 506. For another example, when the photocurrent decreases, the comparison unit 504 may decrease the control signal and provide the control signal to the quantization unit 506. For another example, when there is no change of the photocurrent, the control unit may provide a control signal having a constant value to the quantization unit 506.

The quantization unit 506 may output a first signal and a second signal on the basis of the control signal provided from the comparison unit 504. For example, the quantization unit 506 may output the first signal when the control signal provided from the comparison unit 504 reaches a first threshold value. For another example, the quantization unit 506 may output the second signal when the control signal provided from the comparison unit 504 reaches a second threshold value.

As described above, the first sensor module 402, which is different from a normal image sensor, may output an AER signal. The first sensor module 402 may output 1 bit data indicating only increase/decrease (+ or −) of the intensity instead of outputting a value of RGB intensity for each (x, y) pixel. Output data of the first sensor module 402 may be asynchronously operated without synchronizing with a system clock, and may thus output data only when there is motion of the subject. Therefore, the output of the first sensor module 402 may be dynamic data of the subject, and may be an output of data only when a pixel 602 corresponding to an area where the motion of the subject is recognized as shown in FIG. 6.

Figure 6:
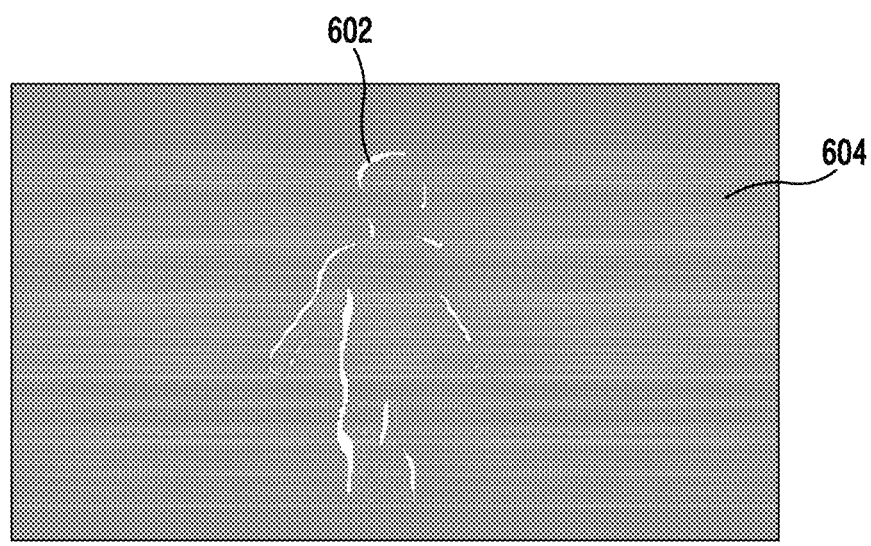
FIG. 6 illustrates an output of the first sensor module according to various embodiments of the present disclosure.

FIG. 6 illustrates an output of the first sensor module 402 according to various embodiments of the present disclosure.

Referring to FIG. 6, an area where motion of a subject is recognized may include a pixel 602 in which a change between a previous frame and a current frame is generated. In FIG. 6, an area displayed in gray may be pixels 604 in which the change between the previous frame and the current frame is not generated. Further, the faster a motion speed of the subject is, the larger the pixel 602 corresponding to an area, where the motion of the subject is detected, is. Therefore, a size of dynamic data output from the first sensor module 402 may increase.

According to various embodiments of the present disclosure, the first sensor module 402 may include a temperature sensor for recognizing a temperature of the subject. For example, the first sensor module 402 may include a thermopile image sensor for recognizing a temperature of the subject. In this event, the first sensor module 402 may output information corresponding to the temperature of the subject.

According to an embodiment, when the first sensor module 402 is the thermopile image sensor, the first sensor module 402 may acquire the dynamic data of the subject using a difference between thermopile pixels which change according to the motion in an FOV, and output the acquired dynamic data of the subject.

According to an embodiment, when the first sensor module 402 is the thermopile image sensor, the first sensor module 402 may output a detection signal of the subject, which generates heat having a predetermined size among subjects located in the FOV. For example, the first sensor module 402 may detect a subject corresponding to a temperature of a person among the subjects located in the FOV, and output the detection signal of the detected subject. Further, the first sensor module may analyze a difference between pixels in frames (e.g., current frame and previous frame) acquired in different time zones and generate difference information.

Figure 7:
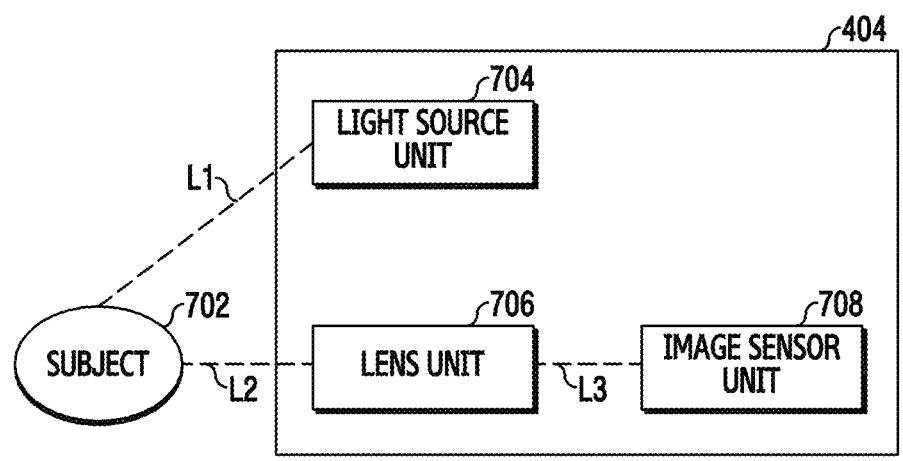
FIG. 7 is a block diagram illustrating a second sensor module according to various embodiments of the present disclosure.

FIG. 7 is a block diagram illustrating a second sensor module according to various embodiments of the present disclosure.

Referring to FIG. 7, the second sensor module 404 may include a light source unit 704, a lens unit 706, and an image sensor unit 708. The second sensor module 404 may include a pixel array storing data including a 2D image sensor, a depth sensor, and a 2D image and depth data.

The light source unit 704 may radiate light L1 to a subject 702. For example, the light source unit 704 may be a Laser Diode (LD) or a Light Emitting Diode (LED). The light L1 (e.g., infrared light or near-infrared light) radiated from the light source unit 704 may be reflected from the subject 702 in the FOV and be entered again.

The lens unit 706 may receive the 2D image of the subjects located in the FOV and light L2 reflected from the subject 702. For example, a light L2 signal may be a signal for measuring a depth (distance) between the second sensor module 404 and the subject. The lens unit 706 may collect the light L2, to which the light L1 radiated from the light source unit 704 is reflected from the subject 702, and provide, to the image sensor unit 708, the remaining light L3 obtained by filtering background noise light, which is disturbed to measure depth data, among the light. Further, the lens unit 706 may receive an optical signal of the 2D image reflected from the subject 702.

The image sensor unit 708 may convert light L3 corresponding to the 2D image and depth output from the lens unit 706 into a photocurrent and generate 2D image data and depth data on the basis of the converted photocurrent. The image sensor unit 708 may include a configuration of generating the 2D image (e.g., a micro lens, a color filter, and a photo diode). Further, the image sensor unit 708 may include a configuration of calculating the depth of the subject on the basis of the light L3 output from the lens unit 706. The image sensor unit 708 may calculate the depth of the subject using a phase difference between the light L1 radiated from the light source unit 704 and the light L3 provided from the lens unit 706.

Figure 8:
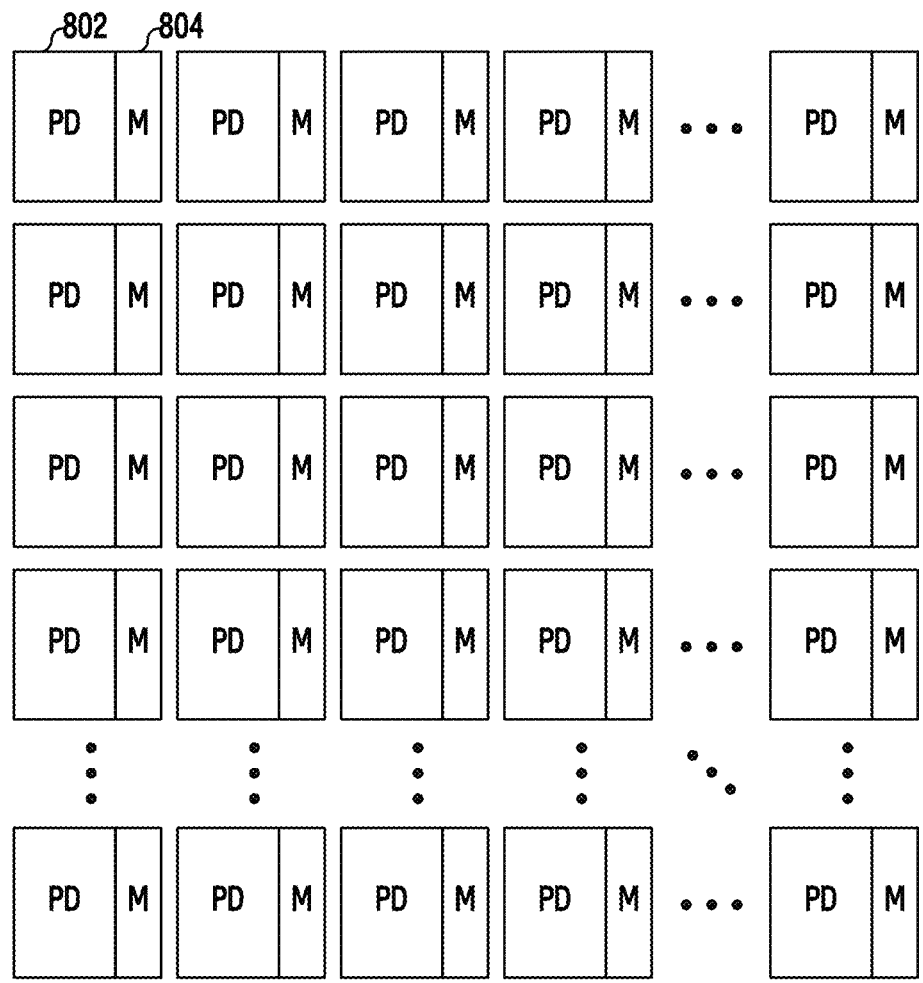
FIG. 8 illustrates a pixel array structure of the second sensor module according to various embodiments of the present disclosure.

Further, the image sensor unit 708 may include a pixel array as shown in FIG. 8. FIG. 8 illustrates a pixel array structure of the second sensor module according to various embodiments of the present disclosure. In FIG. 8, a Photo-Diode (PD) area 802 may convert light into an electrical signal and a memory (M) area 804 may store 2D image data or depth data of the subject 702. The second sensor module 404 may be configured (e.g., global shutter/random access readout) to allow a 2D image and depth data of a first frame to be processed and randomly accessed. The second sensor module 404 may have a configuration in which a 2D image and depth data for each pixel may be stored in a first frame image as shown in FIG. 8. Further, the pixel array structure in FIG. 8 is only an embodiment, and the pixel array structure of the image sensor unit 708 including the PD area 802 and the M area 804 is not limited thereto.

Figure 9:
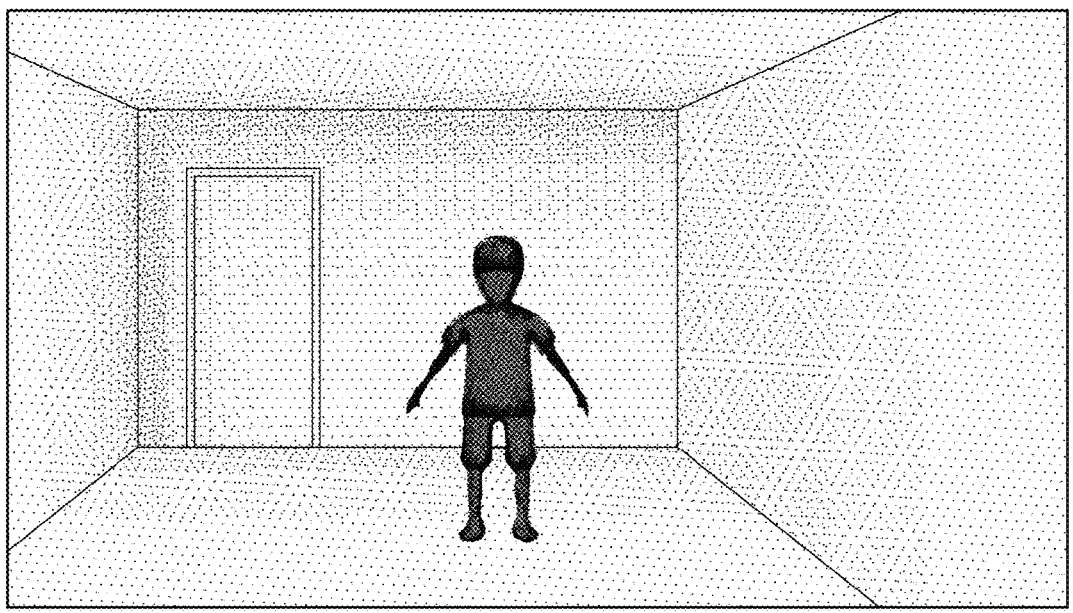
FIG. 9 illustrates an output of the second sensor module according to various embodiments of the present disclosure.

FIG. 9 illustrates a second sensor module according to various embodiments of the present disclosure. Referring to FIG. 9, each pixel output from the image sensor unit 708 may include an XY component (e.g., a 2D image) and a Z component (e.g., a distance between the subject and the second sensor module 404). The 2D image may be a color image or a gray image. Therefore, when pixels output to the second sensor module 404 are displayed, a 3D image may be displayed as shown in FIG. 9.

Figure 10:
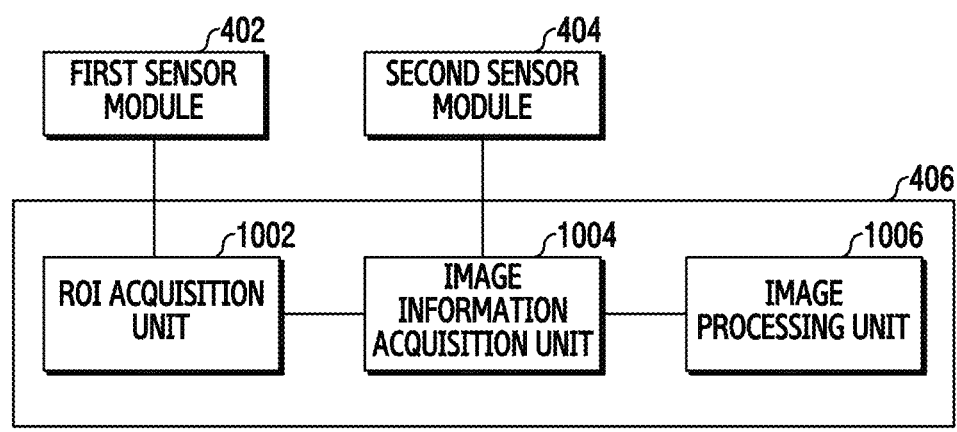
FIG. 10 is a block diagram illustrating a processor according to various embodiments of the present disclosure.

FIG. 10 is a block diagram illustrating a processor according to various embodiments of the present disclosure.

Referring to FIG. 10, the processer 406 may include a Region of Interest (ROI) acquisition unit 1002, an image information acquisition unit 1004, and an image processing unit 1006.

The ROI acquisition unit 1002 may configure an ROI on the basis of information the subject provided from the first sensor module 402. Data output from the first sensor module 402 may be a position (e.g., x, y) of a pixel and difference information (e.g., difference motion) of a corresponding pixel. The ROI acquisition unit 1002 may configure, as the ROI, an area where pixels having a difference from the output of the first sensor module 402 are located. For example, when the first sensor module 402 corresponds to a motion sensor, the ROI acquisition unit 1002 may configure a predetermined size of the ROI including an area where motion of the subject is recognized in the FOV of the first sensor module 402. For another example, when the first sensor module 402 corresponds to a thermopile image sensor, the ROI acquisition unit 1002 may configure a predetermined size of the ROI including an area where a specific temperature is recognized in a clock of the first sensor module 402.

Figure 11:
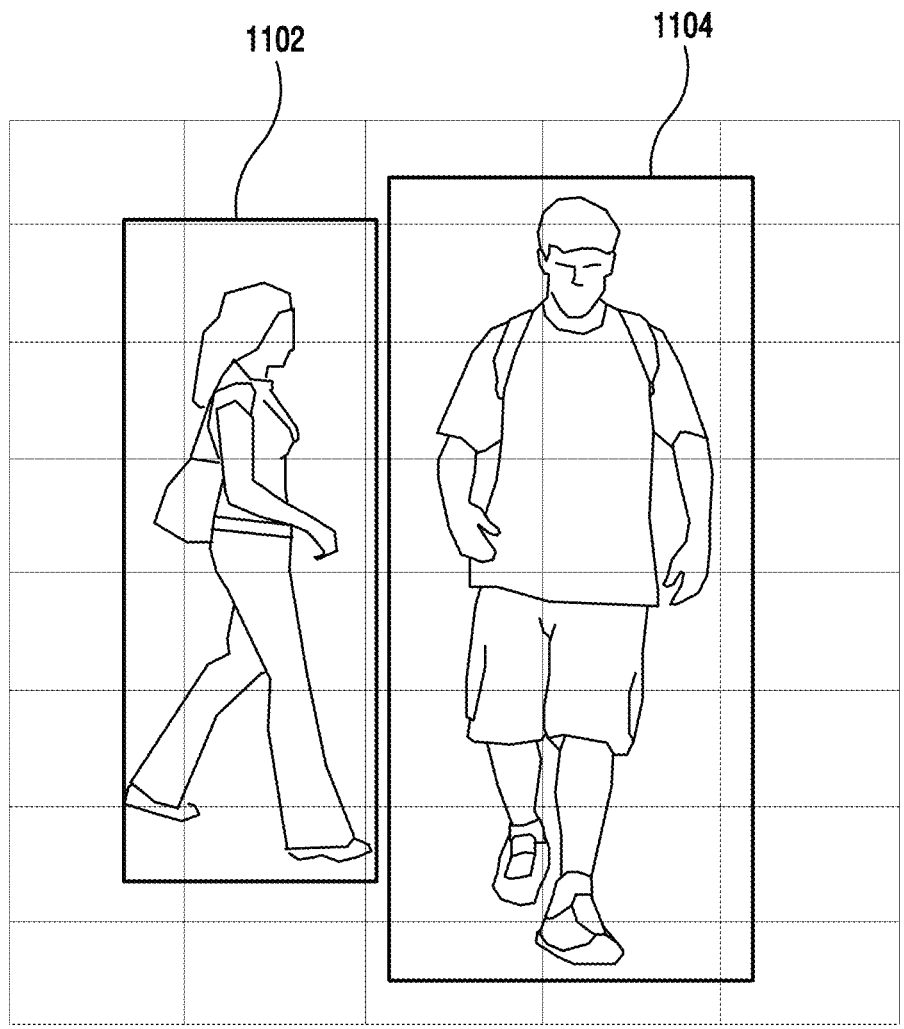
FIG. 11 illustrates an example in which there are two subjects having motion in a Field of View (FOV) of the first sensor module according to various embodiments of the present disclosure.

According to an embodiment, the ROI acquisition unit 1002 may configure two or more ROIs. FIG. 11 illustrates an example in which there are two subjects having motion in an FOV of the first sensor module according to various embodiments of the present disclosure. Referring to FIG. 11, when there are a plurality of subjects having motions, the first sensor module 402 may generate positions and difference data of the subjects having each motion. The first sensor module 402 may generate positions (addresses) and difference data according to the subjects (e.g., ROIs 1102 to 1104) having the motions. Then, the ROI acquisition unit 1002 may acquire areas where the subjects are located to an ROI 1 (e.g., ROI 1102) and an ROI2 (e.g., ROI 1104), respectively.

When two or more ROIs are acquired, the ROI acquisition unit 1002 may determine the all acquired candidate ROIs as ROIs. Further, the ROI acquisition unit 1002 may determine one among a plurality of acquired candidate ROIs as an ROI.

That is, the ROI acquisition unit 1002 may remove the remaining ROI except for one candidate ROI among the plurality of acquired candidate ROIs.

When the ROI includes the plurality of ROIs (e.g., the first ROI 1102 and the second ROI 1104), the ROI acquisition unit 1002 may determine one ROI on the basis of importance. The importance may be motion or a current situation of the subject. For example, when the importance is the motion of the subject, the ROI acquisition unit 1002 may configure, as the ROI, an area where the fastest-moving subject is included. Further, when the importance considers current situation information, the ROI acquisition unit 1002 may configure, as the ROI, a whole area or some areas, in which a subject having a priority according to an area where a subject corresponding to the current situation (e.g., game, watching movies, listening to music, or the like) is included.

For example, when a priority selecting the plurality of ROIs corresponds to the motion of the subject, the ROI acquisition unit 1002 may identify a subject speed in each ROI through the first sensor module 402 and remove the remaining candidate ROI except for the candidate ROI including the fastest moving subject. In an embodiment, when the first sensor module 402 corresponds to a DVS, the ROI acquisition unit 1002 may determine a motion speed of the subject on the basis of output information of the first sensor module 402. For example, the ROI acquisition unit 1002 may determine that the larger the amount of the output information of the first sensor module 402 is, the faster the motion speed of the subject is.

According to an embodiment, when a resolution of the first sensor module 402 and a resolution of the second sensor module 404 are different, the ROI acquisition unit 1002 may determine a size of the ROI correspondingly to a ratio between the resolution of the first sensor module 402 and the resolution of the second sensor module 404.

The image information acquisition unit 1004 may acquire data of ROI configured by the ROI acquisition unit 1002 among images of the second sensor module 404. An image stored in a pixel array of the second sensor module 404 may include a 2D image and depth data of a corresponding pixel. Therefore, the pixel array of the second sensor module 404 may include a memory which can be randomly accessed as shown in FIG. 8.

Figure 12A:
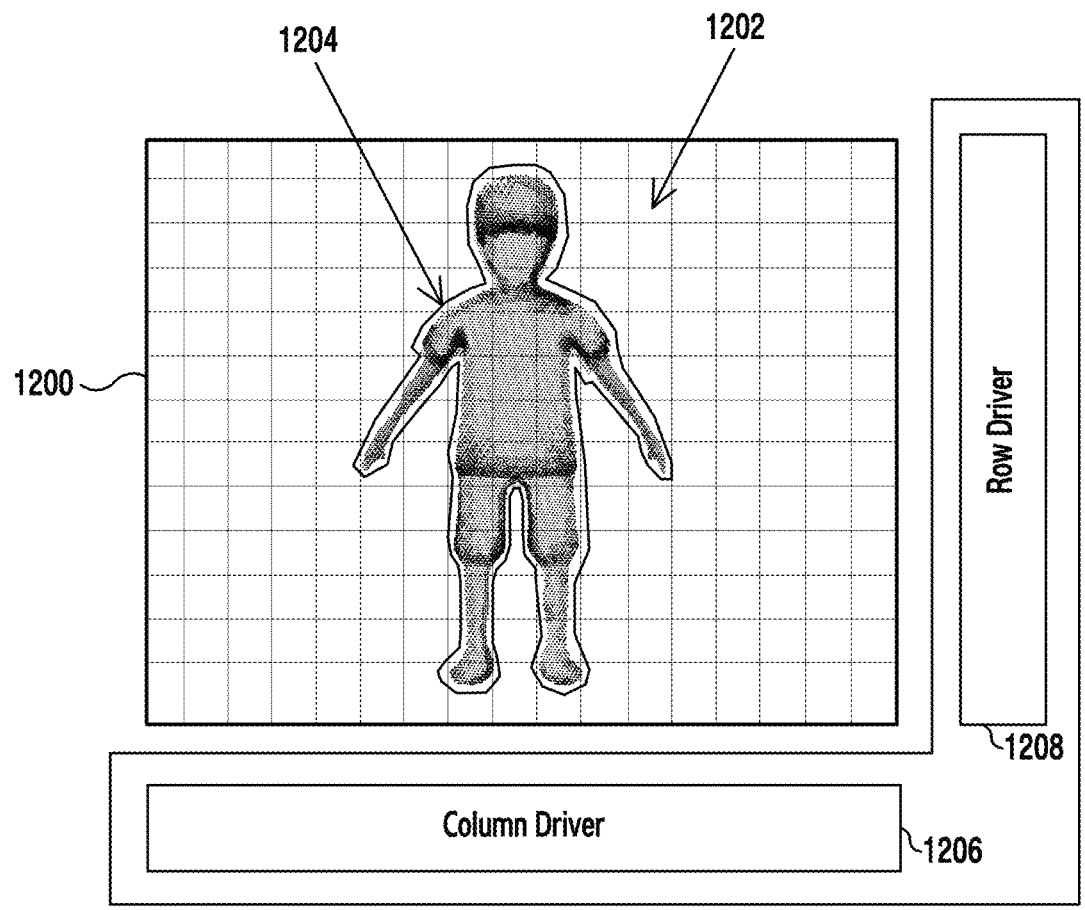
FIG. 12A illustrates a pixel array configuration of the second sensor module according to various embodiments of the present disclosure.
Figure 12B:
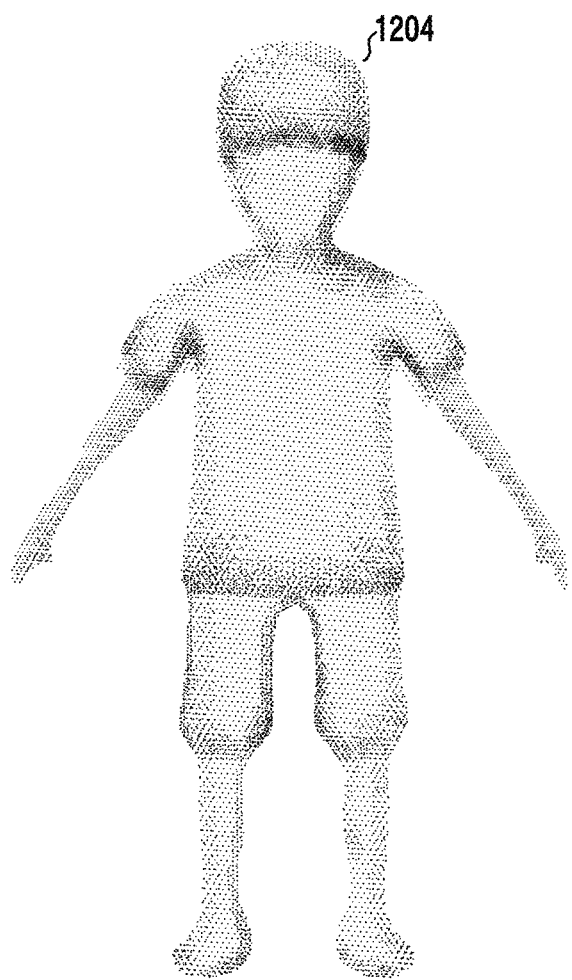
FIG. 12B illustrates a subject of a Region of Interest (ROI) in 3D according to various embodiments of the present disclosure.

FIG. 12A illustrates a pixel array configuration of the second sensor module according to various embodiments of the present disclosure. Referring to FIG. 12A, a pixel array of the second sensor module 404 may be an array 1200 of pixels, as indicated by reference numeral 1202, and each pixel may be expressed as a 2D image and depth data as shown in FIG. 9. The pixel array 1200 may include a column driver 1206 and a row driver 1208 for randomly accessing data of a configured ROI in a whole pixel array. Further, the image information acquisition unit 1004 may receive position information (e.g., a row address and a column address of the pixel array 1200) of the configured ROI 1204 configured from the ROI acquisition unit 1002. The image information acquisition unit 1004 may apply an address for accessing the data of the ROI to the column driver 1206 and the row driver 1208. That is, the image information acquisition unit 1004 may randomly apply an address for accessing data of the configured ROI 1204 in a whole area of the pixel array 1200. In addition, the pixel array 1200 having a memory device for each pixel may output (readout) stored data according to a random addressing request of the image information acquisition unit 1004. Therefore, when accessing an image, the image information acquisition unit 1004 may access not data for a whole area of the pixel array 1200 but only data of only the configured ROI, indicated by reference numeral 1204, as shown in FIG. 12B. FIG. 12B illustrates a subject of an interested area in 3D according to various embodiments of the present disclosure.

The image processing unit 1006 may process an image acquired from the image information acquisition unit 1004. The data output from the image information acquisition unit 1004 may include 2D data and depth data. The 2D data may include brightness of a subject located in an ROI and color data, and depth data may be distance data with the subject located in the ROI. The image processing unit 1006 may display, in 3D, a subject (e.g., a subject of the ROI 1204) of the ROI indicated by reference numeral 1204 as shown in FIG. 12B. When the subject is a person, the image processing unit 1006 may display motion or gesture of the person in 3D.

The image processing unit 1006 may map depth data to each portion of a body of the person corresponding to each pixel among data of the acquired ROI to process the motion or gesture of the person as a 3D image. That is, the image processing unit 1006 may recognize and display an operation of a person by performing an additional image processing on the basis of mapping (depth mapping) of the depth data. For example, the image processing unit 1006 may recognize the operation of the person by extracting metadata such as a skeleton (body), a hand, and a finger-tip coordinate.

Figure 13:
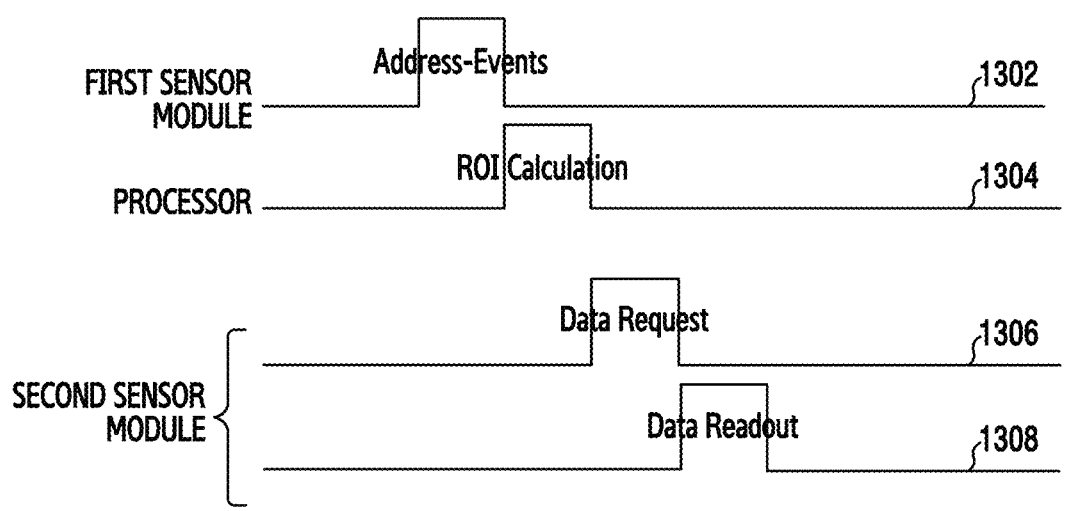
FIG. 13 illustrates an operation timing diagram of the electronic device according to various embodiments of the present disclosure.

FIG. 13 is an operation timing diagram of the electronic device according to various embodiments of the present disclosure.

Referring to FIG. 13, when difference information is recognized according to motions of subjects, the first sensor module 402 may generate an address event as indicated by reference numeral 1302. Then, the processor 406 may configure an ROI on the basis of an output of the first sensor module 402 as indicated by reference numeral 1304. Further, after configuring the ROI, the processor 406 may randomly send a request for data of the ROI to the second sensor module 404 as indicated by reference numeral 1306, and may access and process data of the ROI in the second sensor module 404 as indicated by reference numeral 1308.

A cycle from an address-event to data readout in FIG. 13 may be performed in each pixel unit and may be performed in each frame unit. According to a description of a pixel unit operation, the first sensor module 402 may rightly output an increase/decrease signal when a change is recognized in each pixel. Then, the processor 406 may determine a corresponding pixel as a pixel of the ROI by the output of the first sensor module 402, and may randomly access data of a corresponding pixel in the second sensor module 404. According to a description of an operation of the frame unit, the first sensor module 402 may detect and accumulate difference data of pixel data during a first frame period, and may transmit the difference data to the processor 406 when the frame period is terminated. Further, the processor 406 may analyze an output of the first sensor module 402 to determine whether there is motion, and configure an ROI according to whether there is motion. After configuring the ROI, the processor 406 may access only data of the ROI in the second sensor module 404. The pixel unit operation may be advantageous in terms of latency and the frame unit operation may be synchronized with a system clock to be advantageous in terms of timing adjustment.

The processor 406 may configure the ROI in the FOV area on the basis of the output of the first sensor module 402 and may randomly access data within the configured ROI in the second sensor module 404. Further, the processor may map depth data among the accessed data and process the mapped data, thereby recognizing an action of the subject of the ROI. In this event, data acquired by image processing unit 1010 corresponds to not data for a whole FOV area but data of the ROI so that the amount of data processed by the processor 406 can be reduced. Therefore, the processor 406 may process only data of a desired area so as to reduce a transmission time interval and computational complexity of the data and to reduce power consumption.

Figure 14:
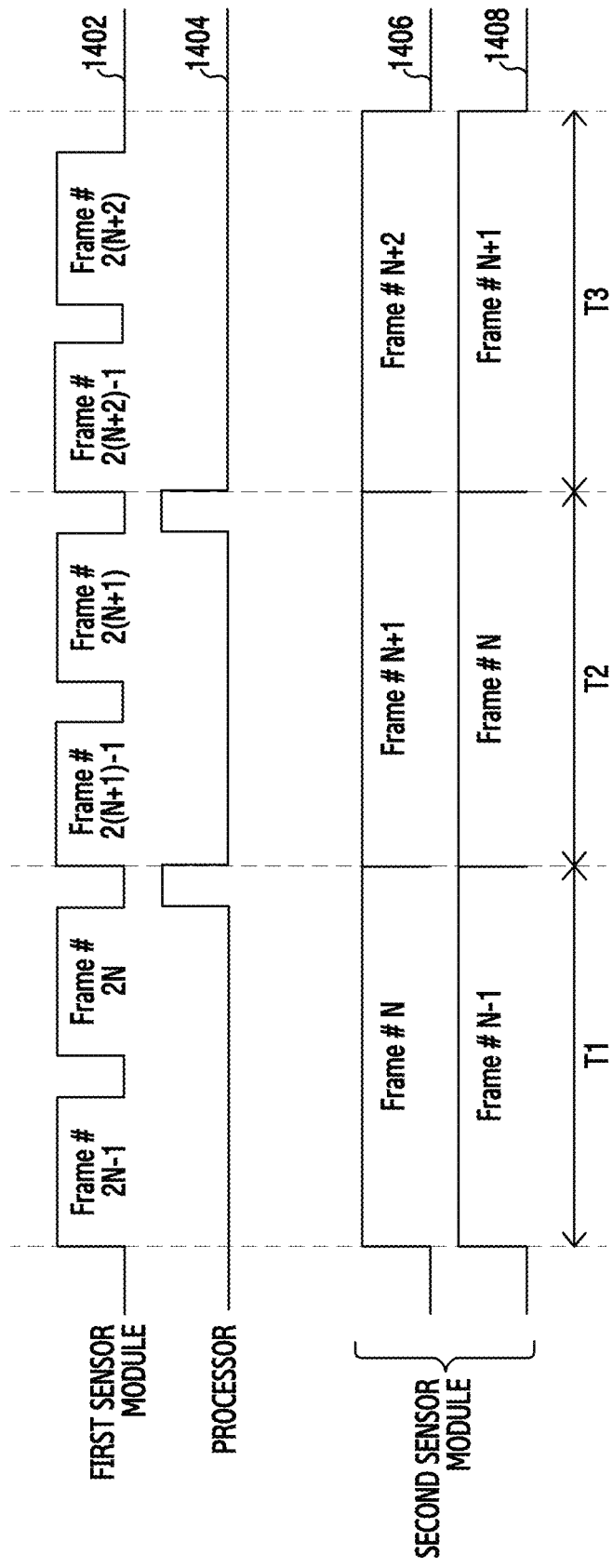
FIG. 14 illustrates an operation timing diagram when the electronic device implements the first sensor module as a normal image sensor according to various embodiments of the present disclosure.

FIG. 14 is an operation timing diagram when the electronic device implements the first sensor module as a normal image sensor according to various embodiments of the present disclosure.

Referring to FIG. 14, the first sensor module 402 which generates difference information may be implemented by using a normal image sensor. When an acquired image has an output of a normal 2D image (e.g., RGB intensity), the first sensor module 402 may calculate difference between current frame and previous frame data instead of an address-event representation and then generate difference information between the two frames. In this event, a frame rate of an image sensor which is utilized as the first sensor module 402 may be designed to have two or more times of frames in comparison with the second sensor module 404 (e.g., depth camera). For example, while the second sensor module 404 acquires one piece of frame data, the first sensor module 402 may acquire two pieces of frame data and the processor 406 may configure the ROI on the basis of this. Further, a pixel array memory of the second sensor module 404 may be implemented in a sequential access (readout) scheme instead of a random access.

As shown in FIG. 14, the first sensor module 402 may acquire two pieces of frame data as indicated by reference numeral 1402 when the second sensor module 404 acquires one piece of frame data as indicated by reference numeral 1406. Further, the first sensor module 402 may analyze two pieces of the acquired frame data to generate difference information. The processor 406 may analyze the difference information of two pieces of the frame data acquired by the first sensor module 402 and configure an ROI as indicated by reference numeral 1404. In this event, the second sensor module 404 may output acquired 3D image data (e.g., data including 2D data and depth data) as indicated by reference numeral 1408. In addition, the processor 406 may acquire data of the configured ROI, as indicated by reference numeral 1404, from data of the second sensor module 404 output as indicated by reference numeral 1408.

For example, in a T1 section of FIG. 14, the first sensor module 402 may acquire data of a 2N−1 frame and a 2N frame and generate difference information by analyzing difference between two acquired frames as indicated by reference numeral 1402. In addition, in the T1 section, the second sensor module 404 may acquire N frame data as indicated by reference numeral 1406 and the pixel array memory may store N−1 frame data as indicated by reference numeral 1408. Further, the processor 406 may analyze difference information output from the first sensor module 402 to configure an ROI as indicated by reference numeral 1404.

Then, in a T2 section, the first sensor module 402 may acquire data of a 2(N+1)−1 frame and a 2(N+1) frame and the second sensor module may acquire data of an N+1 frame. Further, the stored data in the pixel array memory of the second sensor module 404 may be data acquired in a previous frame (e.g., an N frame). Therefore, in the T2 section, the processor 406 may read data of the ROI configured in the previous frame section T1.

When the first sensor module 402 is a normal image sensor, the first sensor module 402 may analyze acquired images of two frames to generate difference information and the processor 406 may analyze the difference information to configure the ROI. Further, the second sensor module 404 may acquire data of one frame, which includes depth data and store data of previous frames while the first sensor module 402 acquires two pieces of data. When receiving the difference information, the processor 406 may analyze the difference information and configure an ROI and may access and process, in a next frame section, data of the configured ROI in the data of previous frame stored in the second sensor module 404. The embodiment may be synchronized with the system clock to extract data of the ROI so that the embodiment can be easily implemented.

Figure 15:
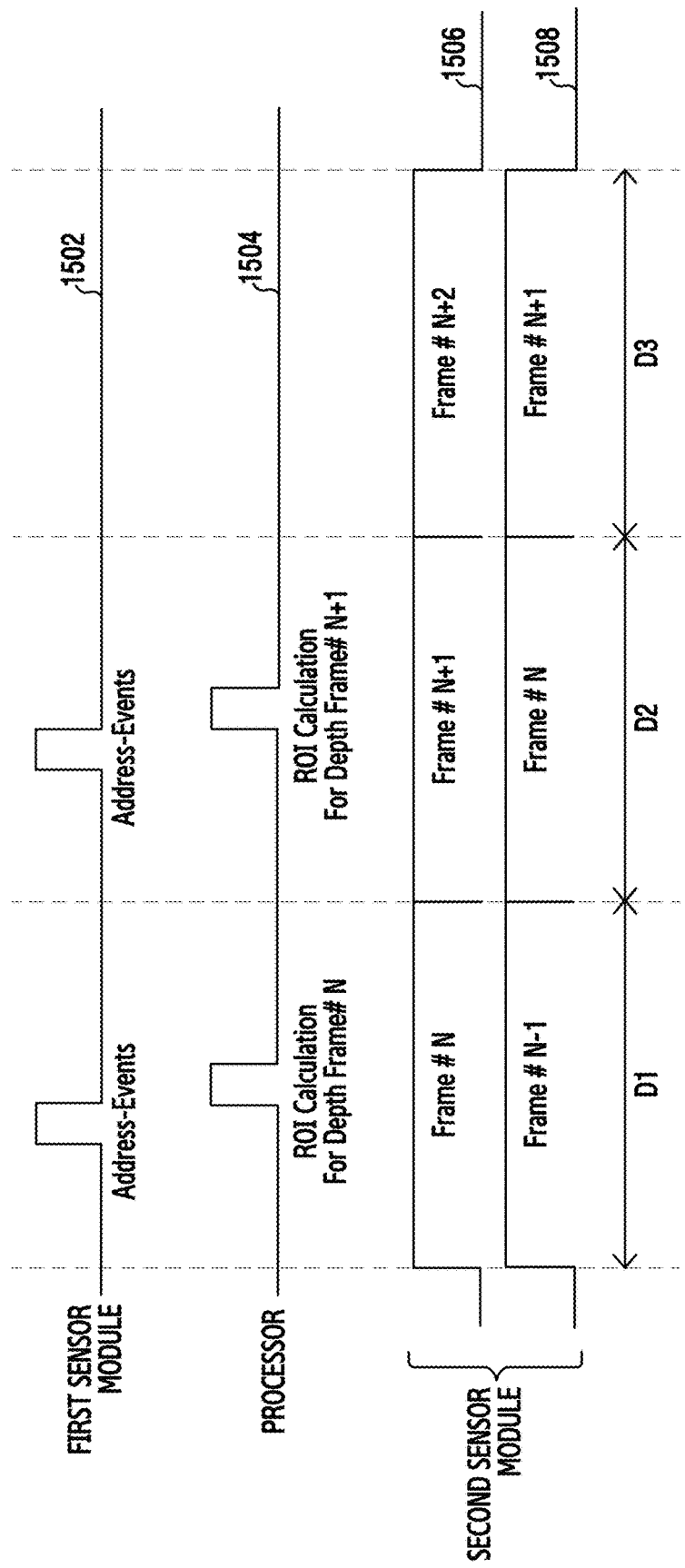
FIG. 15 illustrates an operation timing diagram of a hybrid electronic device according to various embodiments of the present disclosure.

FIG. 15 is an operation timing diagram of a hybrid electronic device according to various embodiments of the present disclosure.

Referring to FIG. 15, a hybrid electronic device may generate difference information in an asynchronous scheme with a system clock, and image data including depth data may be generated in a synchronous scheme with the system clock. Therefore, an address-events data is asynchronously output with the system clock in the first sensor module 402 and the image data (3D data) including the depth data may be synchronized with the system clock in a sequential access (readout) to be output in the second sensor module 404.

As shown in FIG. 15, when a subject movement is generated in the FOV, the first sensor module 402 may generate difference information according to motion of the subject and then output the difference information as address event representation data to the processor 406 as indicated by reference numeral 1502. Then, the processor 406 may analyze the difference information to configure the ROI as indicated by reference numeral 1504. Further, the second sensor module 404 may acquire image data including depth data as indicated by reference numeral 1506 and the pixel array may store data including the depth data acquired from the previous frame as indicated by reference numeral 1508. The processor 406 may configure the ROI and then access and process 3D image data of the configured ROI in a next frame section. In the case of using a hybrid scheme, the first sensor module 402 and the processor 406 may be asynchronous with the system clock to perform operations of generating difference information and configuring the ROI, and the second sensor module 404 may be synchronized with the system clock to perform operations of acquiring and outputting the 3D image data.

For example, the first sensor module 402 may generate, as indicated by reference numeral 1502, difference information according to the motion of the subject in an N frame section in a D1 section of FIG. 15. In addition, in the D1 section, the second sensor module 404 may acquire N frame data as indicated by reference numeral 1506 and a pixel array memory may store N−1 frame data as indicated by reference numeral 1508. Further, the processor 406 may configure an ROI of the N frame data by analyzing difference information output from the first sensor module 402 as indicated by reference numeral 1504.

Then, in a D2 section, the first sensor module 402 may generate difference information of an N+1 frame and the second sensor module may acquire data of the N+1 frame. Further, the processor 406 may access data of an ROI configured in the data of the N frame stored in the pixel array memory of the second sensor module 404.

In a hybrid scheme, when the motion of the subject is generated, the first sensor module 402 may be output AER data, and the processor 406 may calculate the ROI using the AER data. Then, the processor 406 may be synchronized with the system clock in the second sensor module 404 to sequentially access data including stored depth data. In this event, the processor 406 may extract only data of the configured ROI and may process the extracted data of the ROI.

Figure 16A:
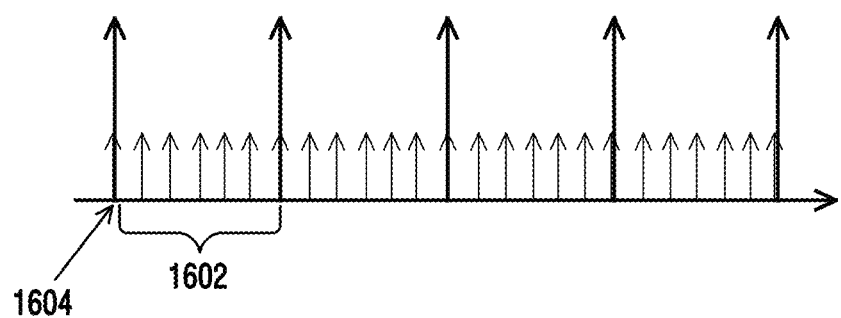
FIGS. 16A, 16B, and 16C illustrate the number of frames per second of a sensor module in the electronic device according to various embodiments of the present disclosure.
Figure 16B:
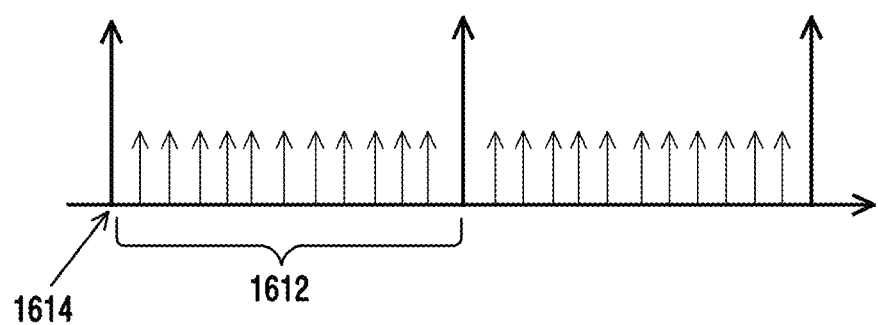
Figure 16C:
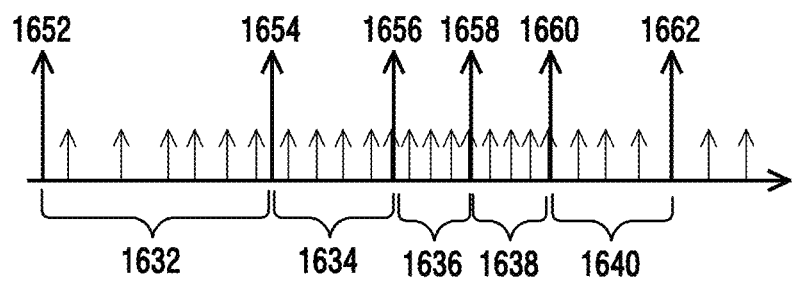

FIGS. 16A, 16B, and 16C illustrate the number of frames per second of a sensor module in the electronic device according to various embodiments of the present disclosure.

Referring to FIG. 16, the processor 406 may control an operation of the second sensor module 404 according to a result (a generation cycle of address-events) in which the first sensor module 402 generates difference information. Therefore, the processor 406 may extract and process a 3D image with respect to an area where a subject having motion is located, and may thus spatially reduce 3D data. Further, the processor 406 may temporally reduce 3D data. For example, between frames of the second sensor module 404, the first sensor module 402 may generate frame difference information for a plurality of frames to reduce the number of processing frames of the 3D data. That is, the processor 406 may perform a temporal interpolation operation with respect to a moving subject to reduce a processing frame of the 3D image data. Further, the processor 406 may analyze the difference information generated by the first sensor module 402, increase the number of times in which the 3D image data is acquired during a time interval in which there are a lot of motions of the subject, and may not acquire or reduce the 3D image data during a time interval in which there is no motion of the subject.

FIG. 16A illustrates an example in which the first sensor module 402 may acquire difference information as 180 fps and the second sensor module 404 may acquire a 3D image as 30 fps as indicated by reference numeral 1602. Further, FIG. 16B illustrates an example in which the first sensor module 402 may acquire difference information as 180 fps and the second sensor module 404 may acquire the 3D image data as 15 fps as indicated by reference numeral 1612. By making a frame cycle in which the first sensor module 402 acquires the difference information faster than a cycle in which the second sensor module 404 acquires the 3D image, 3D image data can be temporally reduced. That is, motion between data frames having depth data is tracked to acquire the difference information so that a size of data to be processed may be reduced.

Referring to FIG. 16C, the first sensor module 404 may generate difference information according to motion of the subject as indicated by reference numeral 1632 to 1640, and the processor 406 may access data having depth data in the second sensor module 404 according to generation frequency of the difference information as indicated by reference numeral 1652 and 1662. Therefore, the processor 406 may increase access frequency of data in a section in which there is a lot of motion of the subject, and lower the access frequency of the data in a section in which there is there is little motion of the subject.

For example, it is assumed that the first sensor module 402 is a DVS having 640×480 pixels and an event-packet is output below.

| Event Packet 1 | Event Packet 2 |
|---|---|
| [$x$: 40, $y$: 30, $p$: +] | [$x$: 38, $y$: 30, $p$: +] |
| [$x$: 40, $y$: 32, $p$: +] | [$x$: 38, $y$: 32, $p$: +] |
| [$x$: 41, $y$: 37, $p$: −] | [$x$: 39, $y$: 37, $p$: −] |
| [$x$: 60, $y$: 353, $p$: +] | [$x$: 58, $y$: 353, $p$: +] |
| [$x$: 67, $y$: 380, $p$: −] | [$x$: 65, $y$: 380, $p$: −] |
| ⋮ | ⋮ |
| [$x$: 600, $y$: 269, $p$: −] | [$x$: 598, $y$: 269, $p$: −] |
| [$x$: 600, $y$: 296, $p$: −] | [$x$: 598, $y$: 296, $p$: −] |

Then, the processor 406 may calculate a packet rate (the number of packet output in each unit time) output in the DVS. The processor 406 may measure a motion speed of the subject by the packet rate output in the DVS and thus vary a frame rate. The packet rate value may be a criterion for how fast (=lots of motion in each unit time) the motion is generated. Therefore, when a value of the packet rate is large, the processor 406 may increase a readout frame rate in which the processor accesses a 3D image in the second sensor module 404, thereby acquiring lot of 3D image data for the quickly moving subject. Further, since the packet rate is lowered when the subject slowly moves, the processor 406 may reduce the frame rate accessing the 3D image in the second sensor module 404. Extremely, when there is no motion of the subject, the processor 406 may not access the 3D image in the second sensor module 404.

An electronic device according to various embodiments of the present disclosure may include a first sensor which acquires first information corresponding to a subject, a second sensor, and a processor connected to the first sensor and the second sensor. Further, the processor may be configured to determine at least one Region of Interest (ROI) on the basis of the first information, acquire second information corresponding to at least a part of the at least one ROI through the second sensor, and perform a function corresponding to motion related to at least one ROI recognized (identified) on the basis of the second information.

According to various embodiments, a first sensor module of the electronic device may generate difference information based on motion of the subject and a second sensor module may generate image data including depth data of the subject.

According to various embodiments, the second sensor module of the electronic device may include a pixel array having a random access configuration including a 2D image and depth data for each pixel.

According to various embodiments, the first sensor module of the electronic device may include a Dynamic Vision Sensor (DVS), and the second sensor module may include one among a stereo vision sensor, a structured light sensor, and a Time-Of-Flight (TOF) sensor.

According to various embodiments, a processor of the electronic device may randomly access image data of ROI in the pixel array.

When acquiring the difference information using the first sensor, the processor of the electronic device may extract image data of the subject corresponding to the ROI and then display the image data as a 3D image.

According to various embodiments, the processor of the electronic device may track a whole or a part of the subject to generate tracking data, and generate the 3D image on the basis of the tracking data to display the 3D image.

According to various embodiments, when at least two candidate ROIs are determined on the basis of the first information, the processor of the electronic device may determine at least one ROI among the candidate ROIs on the basis of importance.

According to various embodiments, the first information may be difference information according to motion of the subject, the importance is the difference information, and the processor of the electronic device may determine a candidate ROI including a subject having large difference information as an ROI.

According to various embodiments, the importance is current application situation information, and the processor of the electronic device may acquire the second information corresponding to a whole or a part of the at least one ROI according to current situation information among the candidate ROIs.

According to various embodiments, the first sensor of the electronic device may be asynchronous with a system clock to acquire the first information, and the second sensor may be synchronized with the system clock to acquire the second information.

According to various embodiments, the first sensor of the electronic device may include a thermopile image sensor, and the thermopile image sensor may recognize a temperature of the subject to generate the first information on the basis of the motion of the subject.

According to various embodiments, the processor of the electronic device may determine a motion speed of the subject on the basis of packet rate output from the first sensor and control frame rates of the first sensor and the second sensor on the basis of the motion speed of the subject.

Figure 17:
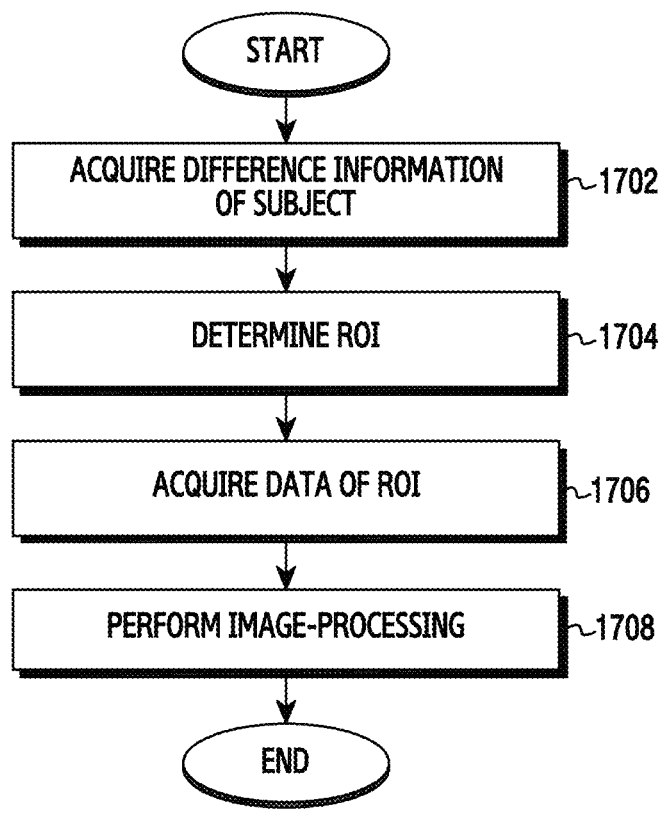
FIG. 17 is a flowchart illustrating a process of processing an image in the electronic device according to various embodiments of the present disclosure.

FIG. 17 is a flowchart illustrating a process of processing an image in the electronic device according to various embodiments of the present disclosure.

Referring to FIG. 17, in operation 1702, the first sensor module 402 may acquire difference information of a subject, which is subsequently sent to the processor 406. The processor 406 may receive difference information corresponding to the subject acquired in the first sensor module 402. The difference information, for example, may be information according to a difference of pixel information generated by motions of subjects in frames acquired in different time intervals. In this example, the first sensor module 402 may be an image sensor which can generate difference values of two pieces of frame data which have a DVS or a time difference. For another example, the difference information may be information according to temperature changes of subjects. In this example, the first sensor module 402 may be a thermopile image sensor.

In operation 1704, the processor 406 may determine at least one ROI on the basis of the difference information. The ROI may be an area where the subject, which has difference information, among subjects in the FOV of the first sensor module 402 is located. For example, the processor 406 may determine, as an ROI, a predetermined size of the ROI including every area where a subject having motion is located or an area where the subject having the motion is located. For another example, the processor 406 may determine a predetermined size of the ROI including an area, which has a temperature similar to a temperature of a person, among the subjects or determine the area, which has the temperature similar to the temperature of the person, as each ROI.

After determining the ROI, the processor 406 may acquire data of the ROI corresponding to at least a part of at least one ROI through the second sensor module 404 in operation 1706. The second sensor module 404 may include a pixel array memory storing data (e.g., 3D image data) including depth data. Further, a resolution of the second sensor module 404 may be identical to or different from a resolution of the first sensor module 402. When a resolution of the first sensor module 402 is identical to a resolution of the second sensor module 404, the processor 406 may access data of the configured ROI. However, when the first sensor module 402 is different from a resolution of the second sensor module 404, the processor 406 may adjust the number of pixels of the configured ROI according to a rate corresponding to the number of pixels of the second sensor module 402, and access data corresponding to the adjusted ROI in the second sensor module 404.

In operation 1708, the processor 406 may process an image on the basis of the data of the ROI. The processor 460 may map depth data corresponding to each pixel of the accessed data to process the mapped depth data as a 3D image. For example, the data of the ROI may be a body (e.g., a hand, a finger, a foot, or the like) of the person. In this event, the data of the ROI may be distinguished with a part of the body, such as a hand or a foot, of the person to be configured. Then, the processor 406 may map the depth data with a body object of the person from the data of the ROI, thereby recognizing the motion. The processor 406 may process an image on the basis of not data for a whole FOV area of the second sensor module 404 but data of the ROI so that the processor may reduce the amount of an operation of a segmentation, which divides an image into an area having similar characteristics, and an image registration which converts a coordinate for color mapping. The processor 406 may also reduce a transmission time interval of the data and consuming power.

Figure 18A:
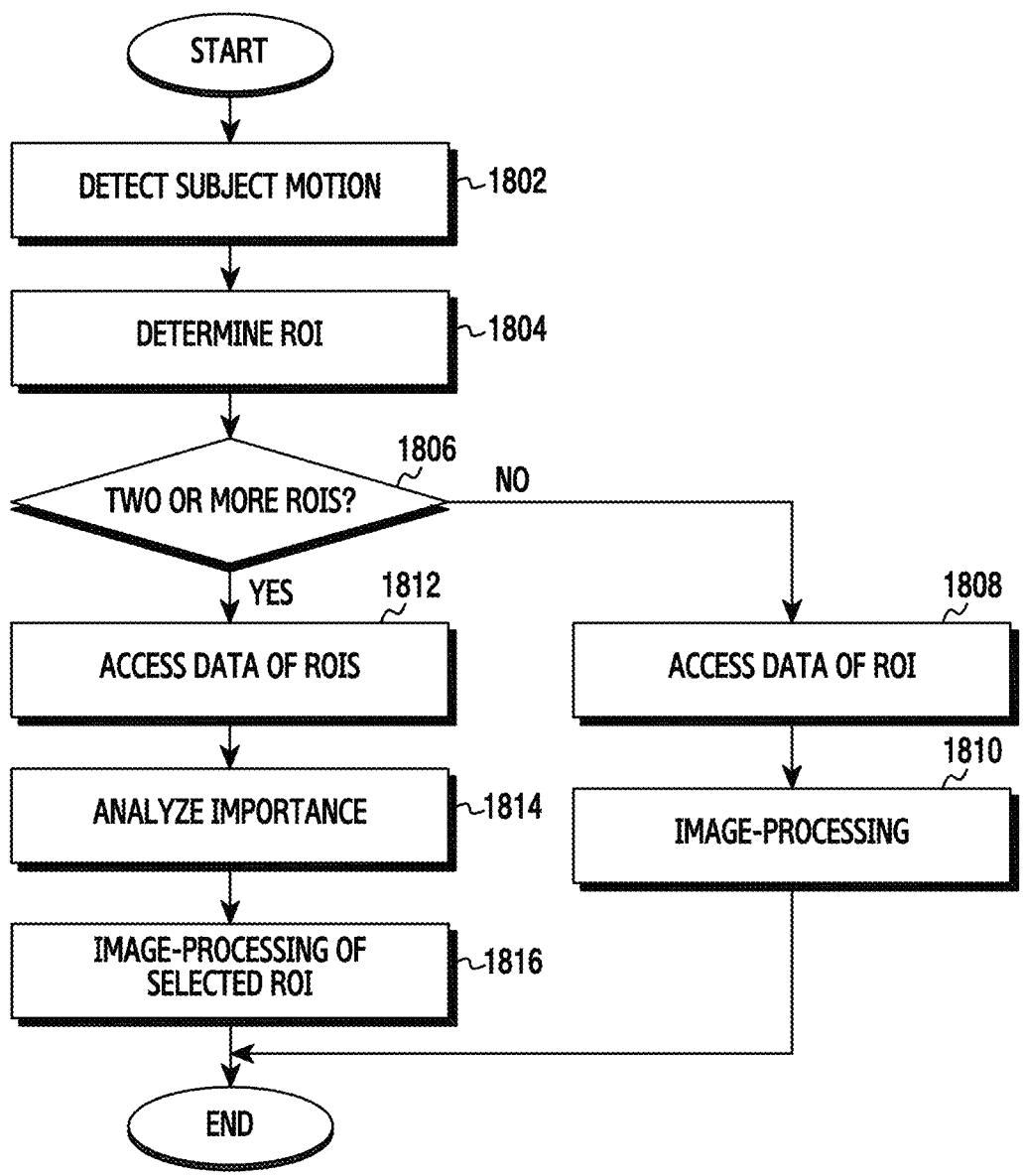
FIGS. 18A and 18B are flowcharts illustrating processes of processing an image by the electronic device when a plurality of ROIs are configured according to various embodiments of the present disclosure.
Figure 18B:
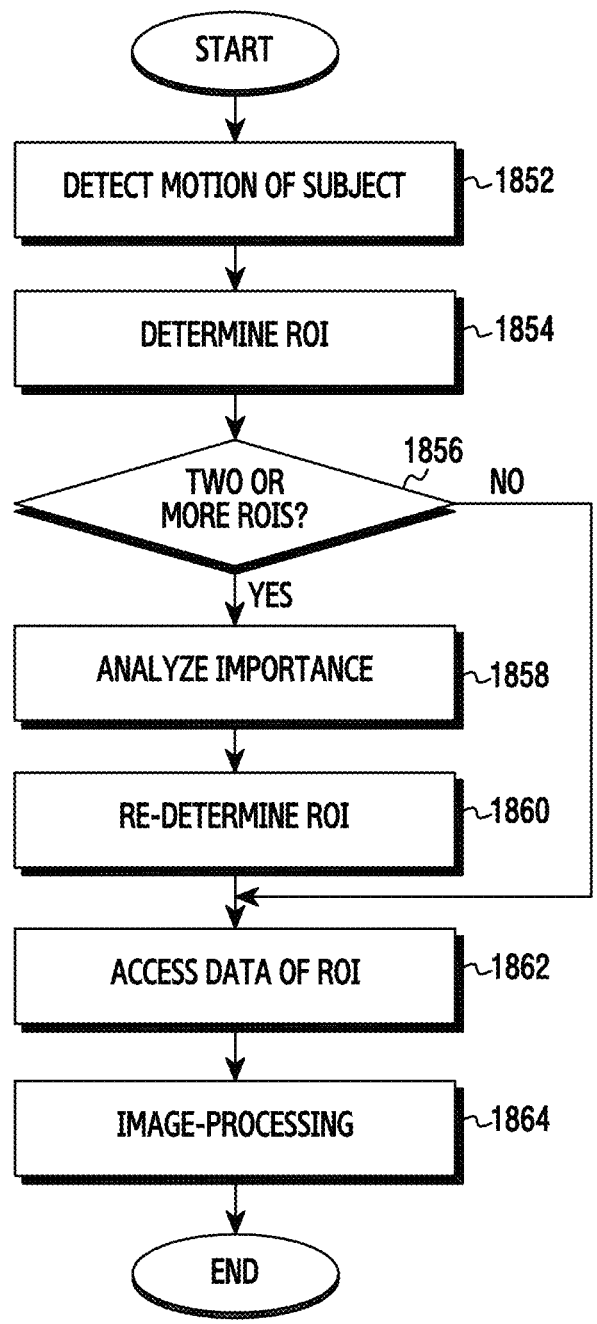

FIGS. 18A and 18B are flowcharts illustrating processes of processing an image by the electronic device when a plurality of ROIs are configured according to various embodiments of the present disclosure.

Referring to FIG. 18A, in operation 1802, the processor 406 may receive difference information corresponding to motions of subjects acquired in the first sensor module 402. For example, the processor 406 may receive only information of an area where motion is generated from the first sensor module 402 or may recognize an area where the motions of subjects are generated using a difference of a plurality of images provided from the first sensor module 402.

In operation 1804, the processor 406 may configure an ROI on the basis of the received difference information. In this event, there a plurality of subjects located in an FOV of the first sensor module 402, and two or more subjects among them may have motions. Then, the first sensor module 402 may generate difference information for each subject having motion. When difference information for two or more subjects generated from the first sensor module 402 has been received, the processor 406 may determine ROIs corresponding to each subject. In this event, when one ROI is determined, the processor 406 may recognize this in operation 1806, access data of the ROI in operation 1808, and process an image of the accessed data in operation 1810.

However, when two or more ROIs are determined, the processor 406 may recognize this in operation 1806, and access data corresponding to the configured ROIs in the second sensor module 404 in operation 1812. Further, in operation 1814, the processor 406 may analyze data of the accessed ROIs to analyze importance. Herein, the importance may be used for a method of distinguishing important motion and unimportant motion. For example, the processor 406 may distinguish the important motion and the unimportant motion on the basis of at least one of a size of a subject having motion and a speed of the subject. Further, the processor 406 may exclude data of ROIs having the unimportant motion. That is, the processor 406 may analyze data corresponding to the ROIs and select at least one ROI.

In operation 1816, the processor 406 may image-process data of the selected ROI. In operation 1816, the processor 406 may recognize motion and a gesture of the subject on the basis of the data of the at least one acquired ROI. For example, the processor 406 may recognize motion and a gesture of a specific person, a hand, and a finger among the data of the ROI.

According to various embodiments of the present disclosure, in FIG. 18A, the processor 406 may access data for two or more ROIs, image-process accessed data of each ROI, and then analyze the importance. That is, in FIG. 18A, the processor 406 may image-process the data of the ROIs in operation 1816, and may select an image of a desired ROI by analyzing the importance among the images of the image-processed ROI in operation 1814.

Referring to FIG. 18B, in operation 1852, the processor 406 may receive difference information corresponding to motions of subjects acquired in the first sensor module 402.

In operation 1854, the processor 406 may determine an ROI on the basis of the received difference information.

When two or more ROIs are determined, the processor 406 may recognize ROIs determined as candidates ROIs in operation 1856, analyze an importance of each candidate ROI in operation 1858, and determine the ROI on the basis of the analyzed importance in operation 1860.

For example, when there are two or more candidate ROIs, the processor 406 may determine one or more ROIs on the basis of the importance. The importance may be motion or current situation information of the subject. For example, the importance may be motion or current situation information of the subject. For example, when the importance is the motion of the subject, the processor 406 may analyze subject motions of candidate ROIs in operation 1858, and determine a candidate ROI including the fastest-moving subject as an ROI in operation 1860.

For example, the importance may be current situation information. The situation information may be a currently executed application, and the application may be a game application, a video play application, and a camera application. When the importance is the situation information, the processor 406 may analyze subjects of candidate ROIs on the basis of the current situation information in operation 1858, and may determine, as the ROI, a candidate ROI including a subject having a priority according to the current situation information in operation 1860.

After re-determining the ROI in operation 1860, the processor 406 may access data of the re-determined ROI in the second sensor module 404 in operation 1862, and image-process data of the accessed ROI in operation 1864. When the determined ROI is one ROI in operation 1856, the processor 406 may proceed to operation 1862, followed by image-processing, operation 1864.

Figure 19:
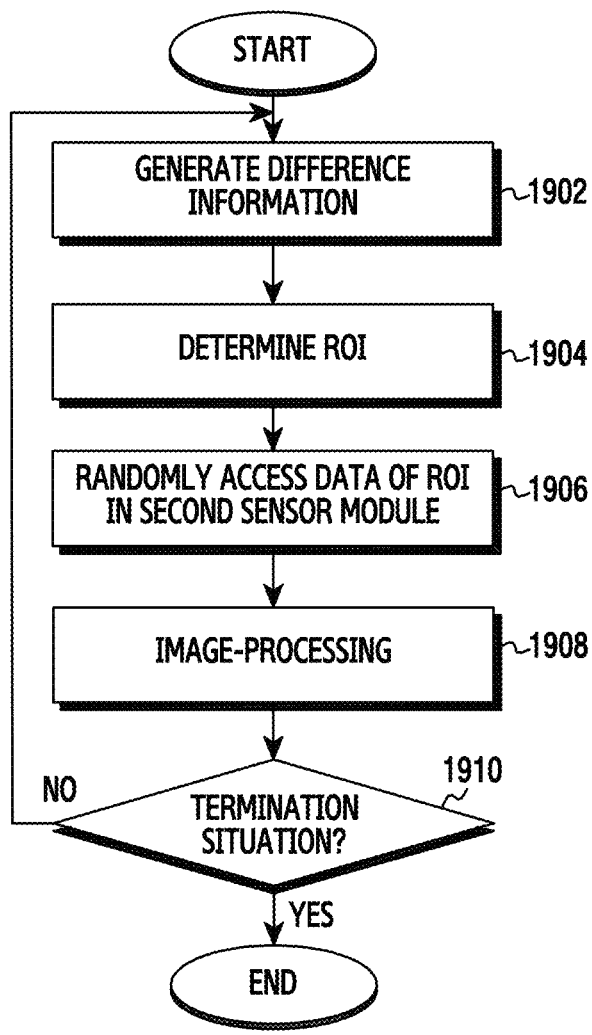
FIG. 19 is a flowchart illustrating a process of processing an image in the electronic device according to various embodiments of the present disclosure.

FIG. 19 is a flowchart illustrating a process of processing an image in the electronic device according to various embodiments of the present disclosure.

Referring to FIG. 19, when difference information based on motion of a subject in a plurality of frames (e.g., a current frame, and a previous frame) is generated by the first sensor module 402, the processor 406 may receive the difference information in operation 1902, and configure the ROI on the basis of the difference information in operation 1904. The processor 406 may randomly access data of the configured ROI in data stored in the second sensor module 404 in operation 1906. The second sensor module 404 may include a pixel array memory which can store a 2D image and depth data for each pixel as shown in FIG. 8. Further, the pixel array memory may have a structure which can randomly access data of a desired area in the pixel array area as shown in FIG. 12A. The processor 406 may extract data corresponding to a subject having motion from the randomly accessed data of the ROI to image-process the data in operation 1908. Then, when image-processing for the randomly accessed data of the ROI is terminated, the processor 406 may recognize the termination and terminate the image-processing operation 1908 in operation 1910. When the image-processing for the randomly accessed data of the ROI is not terminated, the processor 406 may return to operation 1902.

Figure 20:
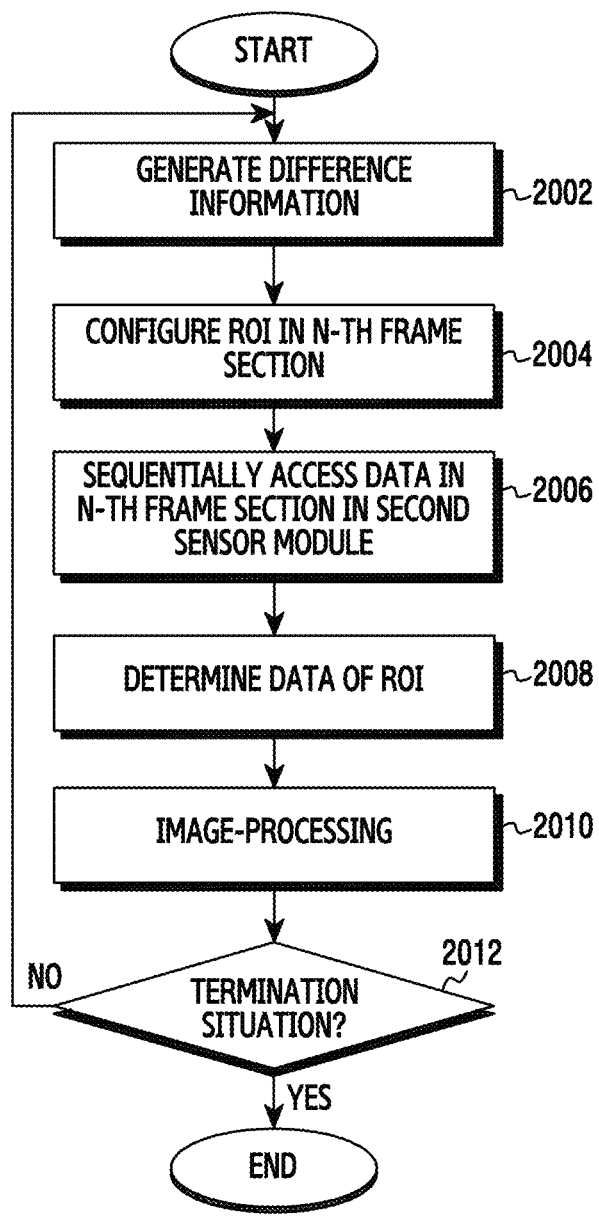
FIG. 20 is a flowchart illustrating another process of processing an image in the electronic device according to various embodiments of the present disclosure.

FIG. 20 is a flowchart illustrating another process of processing an image in the electronic device according to various embodiments of the present disclosure.

Referring to FIG. 20, when difference information is generated in the first sensor module 402 on the basis of motion of a subject, the processor 406 may receive the difference information in operation 2002, and configure the ROI in an N-th frame section on the basis of the difference information in operation 2004. The first sensor module 402 may compare data of a current frame and data of a previous frame to generate the difference information. To this end, a frame rate of the first sensor module 402 may be faster than two times of a frame rate of the second sensor module 404, and the second sensor module 404 may include a pixel array memory which can perform a sequential access (readout). That is, the first sensor module 402 may sequentially acquire two pieces of frame data corresponding to this in the N-th frame section, and compare the two pieces of frame data to generate the difference information. Further, the processor 406 may analyze the difference information received from the first sensor module 402 in the N-th frame section to calculate the ROI. Further, the second sensor module 404 may recognize data corresponding to this in the N-th frame section, and the recognized data may include a 2D image and depth data of each pixel. Further, in the pixel array memory of the second sensor module 404, data of an N−1th frame may be stored. Further, when an N+1th frame section starts, data of the N-th frame may be stored in the pixel array memory of the second sensor module 404.

When an ROI corresponding to this is configured in the N-th frame section and the N+1th frame starts, the processor 406 may sequentially access data of the N-th frame section in the pixel array memory of the second sensor module 404 in operation 2006. The processor 406 may determine configured data of the ROI in the sequentially accessed data of the N-th frame section in operation 2008. Further, the processor 406 may extract data corresponding to a subject having motion from the determined data of the ROI to image-process the data in operation 2010. Then, when image-processing for the determined data of the ROI is terminated, the processor 406 may recognize the termination and terminate the image-processing operation in operation 2012. When the image-processing for the determined data of the ROI is not terminated in operation 2012, the processor 406 may return to operation 2002.

An operation method of an electronic device according to various embodiments of the present disclosure may include operations of: acquiring first information corresponding to a subject through a first sensor; determining at least one ROI on the basis of the first information; acquiring second information corresponding to at least a part of the at least one ROI through a second sensor; and performing a function corresponding to motion related to at least one ROI that is at least one of recognized or identified on the basis of the second information.

According to various embodiments, the first information may include difference information on the basis of the motion of the subject, and the second information may be image information including depth data of the subject.

According to various embodiments, the operation of acquiring the second information corresponding to at least a part of the at least one ROI may include an operation of accessing and processing only image data corresponding to the ROI in the second sensor.

According to various embodiments, the first information may be difference information, which is configured by 1-bit data and indicates whether there is motion of the subject for each pixel, and the operation of determining at least one ROI may include an operation of calculating the difference information and determining an area of a subject having motion as the ROI.

According to various embodiments, an operation of performing a function corresponding to the motion related to the ROI may include operations of: tracking a whole or a part of the subject to generate tracking data; and generating the 3D image on the basis of the tracking data to display the 3D image.

According to various embodiments, pixel data of the tracking data may include 2D image data and depth data, and the operation of generating the 3D image on the basis of the tracking data to display the 3D image may include an operation of mapping the depth data to the 2D image data to generate and display the mapped data as the 3D image.

According to various embodiments, the operation of determining the at least one ROI on the basis of the first information may include operations of: extracting the ROIs on the basis of the first information; and when the extracted ROI has two or more candidate ROIs, determining at least one ROI among the candidate ROIs on the basis of the importance.

According to various embodiments, the first information may be difference information according to motion of the subject, the importance is the difference information, and the operation of determining the ROI may include an operation of determining a candidate ROI including a subject having large difference information as an ROI.

According to various embodiments, the importance is current application situation information, and the operation of determining the ROI may include an operation of configuring a candidate ROI according to current situation information among the candidate ROIs as the ROI.

According to various embodiments, the operation method of the electronic device may further include operations of: determining a motion speed of the subject on the basis of packet rate of first information acquired from a first sensor; and controlling frame rates of the first sensor and a second sensor on the basis of the motion speed of the subject.

According to various embodiments of the present disclosure, a method of processing an image and an electronic device thereof may recognize motion and a gesture from a subject of an area, which is configured as an ROI, among a whole image so that calculation and consumption power for the image-processing may be reduced.

According to various embodiments of the present disclosure, a method of processing an image and an electronic device thereof may transmit only image information of the configured ROI so that a transmission time interval may be shorten.

According to various embodiments of the present disclosure, a method of processing an image and an electronic device thereof may configure a Region of Interest (ROI) among a whole image through hardware so that data to be additionally image-processed (e.g., segmentation and registration in a skeleton middleware) of a processor may be simplified.

Although the present disclosure has been described with various exemplary embodiments, various changes and modifications may be suggested to one skilled in the art. It is intended that the present disclosure encompass such changes and modifications as fall within the scope of the appended claims.

What is claimed is:
1. An electronic device comprising:
a first image sensor configured to calculate a packet rate output in dynamic vision sensor and to measure a motion speed of a subject by the packet rate output in the dynamic vision sensor;
a second image sensor configured to be synchronized with a system clock; and
a processor operatively coupled to the first image sensor and the second image sensor, wherein the processor is configured to:
identify at least one subject having a motion based on first information obtained using the first image sensor, the motion determined as a function of a comparison between a current image frame obtained from the first image sensor and a previous image frame obtained from the first image sensor,
determine at least one region of interest (ROI) corresponding to the motion of the at least one subject from the current image frame,
after determining the at least one ROI, obtain second information corresponding to the at least one ROI, using the second image sensor,
identify a motion speed of the subject included in each of the at least one ROI based on the second information,
determine one ROI among the at least one ROI based on the motion speed,
identify a motion of the subject included in the at least one ROI, and
perform a function corresponding to the motion.
2. The electronic device of claim 1, wherein:
the first image sensor is configured to generate difference information based on the motion of the subject, and
the second image sensor is configured to generate image data including depth data of the subject.
3. The electronic device of claim 2, wherein:
the second image sensor comprises a pixel array having a random access configuration, and
the second image sensor is configured to obtain a 2D image and depth data for each pixel.
4. The electronic device of claim 3, wherein the first image sensor includes a dynamic vision sensor (DVS), and the second image sensor comprises one of a stereo vision sensor, a structured light sensor, or a time-of-flight (TOF) sensor.
5. The electronic device of claim 3, wherein the processor is configured to randomly access the image data of the at least one ROI in the pixel array.
6. The electronic device of claim 5, wherein the processor is configured to:
extract image data of the subject corresponding to the at least one ROI when obtaining the difference information using the first image sensor, and
display the extracted image data as a 3D image.
7. The electronic device of claim 6, wherein the processor is configured to:

generate a tracking data by tracking a whole or a part of the subject, and
generate the 3D image based on the tracking data.

8. The electronic device of claim 1, wherein, when at least two candidate ROIs are determined based on the first information, the processor is configured to determine one ROI among the at least two candidate ROIs based on importance.

9. The electronic device of claim 8, wherein:
the first information comprises difference information based on the motion of the subject, the importance corresponds to the difference information, and
the processor is configured to determine one ROI among the at least two candidate ROIs, wherein the one ROI includes the subject having difference information comprising a largest amount of output information of the first image sensor compared to that of remaining candidate ROIs in the at least two candidate ROIs.

10. The electronic device of claim 8, wherein:
the importance corresponds to current application situation information, and
the processor is configured to obtain second information corresponding to a whole or a part of the at least one ROI according to current situation information among the at least two candidate ROIs.

11. The electronic device of claim 1, wherein:
the first image sensor is asynchronous with the system clock to obtain the first information, and
the second image sensor is synchronized with the system clock to obtain the second information.

12. The electronic device of claim 1, wherein the processor is configured to determine the motion speed of the subject based on a packet rate output from the first image sensor and controls frame rates of the first image sensor and the second image sensor based on the motion speed of the subject.

13. A method of operating an electronic device, the method comprising:
identifying, by a processor, at least one subject having a motion based on first information obtained using a first image sensor configured a first image sensor configured to calculate a packet rate output in dynamic vision sensor and to measure a motion speed of a subject by the packet rate output in the dynamic vision sensor, the motion determined as a function of a comparison between a current image frame obtained from the first image sensor and a pervious image frame obtained from a second image sensor configured to be synchronized with a system clock;
determining, by the processor, at least one region of interest (ROI) based on the motion of at least one subject from the current image frame;
after determining the at least one ROI, obtaining, by the processor, second information corresponding to the at least one ROI from image data, using the second image sensor;
identifying, by the processor, a motion speed of the subject included in each of the at least one ROI based on the second information;

determining, by the processor, one ROI among the at least one ROI based on the motion speed; and
performing a function corresponding to the motion.

14. The method of claim 13, wherein:
the first information comprises difference information based on the motion of a subject, and the second information corresponds to image information including depth data of the subject.

15. The method of claim 14, wherein:
the first information corresponds to difference information, which is configured by 1-bit data and indicates whether there is motion of the subject for each pixel, and
determining of the at least one ROI comprises calculating, by the processor, the difference information and determining, by the processor, an area of the subject having the motion as the ROI.

16. The method of claim 15, wherein the performing of the function corresponding to the motion comprises:
generating, by the processor, a tracking data by tracking a whole or a part of the subject; and
generating, by the processor, a 3D image based on the tracking data.

17. The method of claim 16, wherein:
each pixel data of the tracking data comprises 2D image data and depth data, and
generating of the 3D image based on the tracking data comprises mapping, by the processor, the depth data to the 2D image data in order to generate and display the mapped depth data as the 3D image.

18. The method of claim 13, wherein determining of the at least one ROI based on the first information comprises:
extracting, by the processor, image data of the at least one subject corresponding to the at least one ROI based on the first information; and
when the at least one ROI has two or more candidate ROIs, determining, by the processor, one ROI among the two or more candidate ROIs based on importance.

19. The method of claim 18, wherein:
the first information comprises difference information based on the motion of the subject, the importance corresponds to the difference information, and
determining of the one ROI comprises determining, by the processor, the one ROI among the two or more candidate ROIs wherein the one ROI includes the subject having a difference information comprising a largest amount of output information of the first image sensor compared to that of remaining candidate ROIs in the two or more candidate ROIs.

20. The method of claim 13, further comprising:
determining, by the processor, the motion speed of the subject based on a packet rate of the first information obtained from the first image sensor; and
controlling, by the processor, frame rates of the first image sensor and the second image sensor based on the motion speed of the subject.

* * * * *